(12) United States Patent
Chen et al.

(10) Patent No.: US 11,698,485 B2
(45) Date of Patent: Jul. 11, 2023

(54) METHOD FOR MANUFACTURING MULTIMODE OPTICAL FIBERS

(71) Applicant: CORNING INCORPORATED, Corning, NY (US)

(72) Inventors: Xin Chen, Painted Post, NY (US); Ming-Jun Li, Horseheads, NY (US); Simit Mayank Patel, Greensboro, NC (US)

(73) Assignee: Corning Incorporated, Corning, NY (US)

( * ) Notice: Subject to any disclaimer, the term of this patent is extended or adjusted under 35 U.S.C. 154(b) by 210 days.

(21) Appl. No.: 17/120,909

(22) Filed: Dec. 14, 2020

(65) Prior Publication Data

US 2021/0208332 A1 Jul. 8, 2021

Related U.S. Application Data

(60) Provisional application No. 62/956,910, filed on Jan. 3, 2020.

(51) Int. Cl.
*G02B 6/028* (2006.01)
*C03B 37/025* (2006.01)
(Continued)

(52) U.S. Cl.
CPC .......... *G02B 6/0281* (2013.01); *C03B 37/027* (2013.01); *C03B 37/0253* (2013.01); *G02B 6/0365* (2013.01); *C03B 2205/40* (2013.01)

(58) Field of Classification Search
CPC ................ G02B 6/0365; G02B 6/0281; C03B 37/0253; C03B 37/027; C03B 2205/40
See application file for complete search history.

(56) References Cited

U.S. PATENT DOCUMENTS

| | | | |
|---|---|---|---|
| 5,073,179 A | 12/1991 | Yoshimura et al. | |
| 6,574,403 B1 | 6/2003 | Golowich et al. | |
| 6,664,801 B1 | 12/2003 | Palusa | |
| 7,926,304 B2 | 4/2011 | Costello et al. | |

(Continued)

FOREIGN PATENT DOCUMENTS

| | | |
|---|---|---|
| EP | 2207022 A1 | 7/2010 |
| JP | 56-043528 A | 4/1981 |

(Continued)

OTHER PUBLICATIONS

1120 Bare Fiber Aligner, http://www.pkinetics.com/products/productdetail.aspx?model=1120.

(Continued)

*Primary Examiner* — Thomas A Hollweg
*Assistant Examiner* — Mary A El-Shammaa
(74) *Attorney, Agent, or Firm* — Kevin L. Bray

(57) ABSTRACT

A method of manufacturing a multimode optical fiber includes specifying a peak wavelength $\lambda_P$ for the multimode optical fiber. The peak wavelength $\lambda_P$ corresponds to a wavelength at which the multimode optical fiber has a maximum bandwidth. The multimode optical fiber comprises a core and a cladding surrounding and directly adjacent to the core. The core has a radius $r_1$ and a maximum relative refractive index $\Delta_{1,MAX} > 0$. The cladding comprises a depressed-index region having a minimum relative refractive index $\Delta_{3,MIN} < 0$ and a volume v. A draw tension T for the multimode optical fiber is selected based on a correlation relating peak wavelength $\lambda_P$ to draw tension T, the correlation comprising a correlation constant. The correlation constant K is a function of at least one of $\Delta_{1,MAX}$, $r_1$, v, $\Delta_{3,MIN}$, and $\lambda_P$. The multimode optical fiber is drawn from a preform at the draw tension T.

20 Claims, 9 Drawing Sheets

(51) Int. Cl.
*C03B 37/027* (2006.01)
*G02B 6/036* (2006.01)

(56) References Cited

U.S. PATENT DOCUMENTS

| | | |
|---|---|---|
| 8,078,053 B1 | 12/2011 | Mazzini et al. |
| 8,260,103 B2 | 9/2012 | Gholami et al. |
| 8,322,166 B2 | 12/2012 | Bookbinder et al. |
| 8,432,539 B2 | 4/2013 | Gholami et al. |
| 8,797,519 B2 | 8/2014 | Chen et al. |
| 8,852,390 B2 | 10/2014 | Hayashi |
| 9,279,741 B2 | 3/2016 | Bennett et al. |
| 9,377,377 B2 | 6/2016 | Chen et al. |
| 10,131,566 B2 | 11/2018 | Bowker et al. |
| 2012/0125053 A1 | 5/2012 | Bookbinder et al. |
| 2013/0029038 A1 | 1/2013 | Bickham et al. |
| 2013/0322836 A1 | 12/2013 | Bickham et al. |
| 2014/0318188 A1 | 10/2014 | Bowker et al. |

FOREIGN PATENT DOCUMENTS

| | | |
|---|---|---|
| JP | 5643528 B2 | 12/2014 |
| WO | 2013/003016 A1 | 1/2013 |
| WO | 2014/206464 A1 | 12/2014 |

OTHER PUBLICATIONS

Gholami et al., Compensation of Chromatic Dispersion by Modal Dispersion in MMF- and VCSEL-based Gigabit Ethernet Transmissions, IEEE Photonics Technology Letters, vol. 21, No. 10, pp. 645-647, May 15, 2009.

Kise et al, "Development of 1060nm 25-Gb/s VCSEL and demonstration of 300m and 500m system reach using MMFs and link optimized for 1060nm", Optical Fiber Communication Conference, 2014, 3 pages.

International Search Report and Written Opinion of the International Searching Authority; PCT/US2020/064404; dated Mar. 10, 2021, 11 pages; European Patent Office.

| | Core Radius $r_1(\mu m)$ | $w_1(\mu m)$ | $\Delta(\%)$ | Up Dope Delta $\Delta(\%)$ | K (nm/g) | $\Delta T(g)$ | Peak Wavelength Tuning Range $\Delta_p(nm)$ |
|---|---|---|---|---|---|---|---|
| Comp. Ex. Profile | 25 | 5.75 | 0.98 | 0 | -1.42998 | 175 | -250.247 |
| Ex. Profile 1 | 25 | 5 | 1 | 0 | -1.92975 | 175 | -337.706 |
| Ex. Profile 2 | 25.5 | 4.5 | 1 | 0 | -2.47866 | 175 | -433.765 |
| Ex. Profile 3 | 26.25 | 4.1 | 1.02 | 0 | -3.22739 | 175 | -564.794 |
| Ex. Profile 4 | 23.75 | 9 | 0.93 | 0 | -0.4999 | 175 | -87.483 |
| Ex. Profile 5 | 24.1 | 9.1 | 0.98 | 0.11 | -2.2714 | 175 | -397.495 |

METHOD FOR MANUFACTURING MULTIMODE OPTICAL FIBERS

This application claims priority under 35 USC § 119(e) from U.S. Provisional Patent Application Ser. No. 62/956,910, filed on Jan. 3, 2020, and which is incorporated by reference herein in its entirety.

FIELD OF THE DISCLOSURE

The present disclosure relates to optical fibers. More specifically, the present disclosure relates to a method of manufacturing multimode optical fibers with a peak wavelength tuning range.

BACKGROUND

Optical fibers are utilized in a variety of telecommunication applications. Manufacturing processes for producing optical fibers typically include drawing an optical fiber from a heated glass preform in a draw furnace, cooling the drawn optical fiber, and coating the optical fiber. The bandwidth of a multimode optical fiber is generally limited by inter-modal chromatic dispersion. Optical fibers can be optimized at different wavelengths. Optical fibers optimized for longer wavelengths may have lower chromatic dispersion and can, therefore, achieve longer transmission distances.

SUMMARY OF THE DISCLOSURE

According to one aspect of the present disclosure, a method of manufacturing a multimode optical fiber includes specifying a peak wavelength $\lambda_P$ for the multimode optical fiber. The peak wavelength $\lambda_P$ corresponds to a wavelength at which the multimode optical fiber has a maximum bandwidth. The multimode optical fiber comprises a core and a cladding surrounding and directly adjacent to the core. The core has a radius $r_1$ and a maximum relative refractive index $\Delta_{1,MAX} > 0$. The cladding comprises a depressed-index region having a minimum relative refractive index $\Delta_{3,MIN} < 0$ and a volume v. A draw tension T for the multimode optical fiber is selected based on a correlation relating peak wavelength $\lambda_P$ to draw tension T, the correlation comprising a correlation constant. The correlation constant K is a function of at least one of $\Delta_{1,MAX}$, $r_1$, v, $\Delta_{3,MIN}$, and $\lambda_P$. The multimode optical fiber is drawn from a preform at the draw tension T.

According to another aspect of the present disclosure, a method of manufacturing a multimode optical fiber includes drawings the multimode optical fiber from a preform at a draw tension T. The multimode optical fiber comprises a core and a cladding surrounding and directly adjacent to the core. The core has a radius $r_1$ and a maximum relative refractive index $\Delta_{1,MAX} > 0$. The cladding is comprised of a depressed-index region having a maximum relative refractive index $\Delta_{3,MIN} < 0$ and a volume v. The multimode optical fiber has a peak wavelength $\lambda_P$ at which the multimode optical fiber has a maximum bandwidth. The peak wavelength $\lambda_P$ is compared to a selected target peak wavelength $\lambda_{P,target}$. The peak wavelength $\lambda_P$ differs from the selected target peak wavelength $\lambda_{P,target}$ by a difference magnitude $\Delta\lambda_P$ given by $\Delta\lambda_P = |\lambda_P - \lambda_{P,target}|$. The draw tension T is changed by an adjustment tension $\Delta T$. The adjustment tension $\Delta T$ is selected to vary the peak wavelength $\lambda_P$ to reduce the difference magnitude $\Delta\lambda_P$. The selection of the adjustment tension $\Delta T$ is based on a correlation relating the adjustment tension $\Delta T$ to the difference magnitude $\Delta\lambda_P$. The correlation comprises a correlation constant K. The correlation constant K is a function of at least one of $\Delta_{1,MAX}$, $r_1$, v, $\Delta_{3,MIN}$, and $\lambda_{P,target}$.

According to another aspect of the present disclosure, a multimode optical fiber includes a core having a core radius $r_1$ in a range of from about 25 μm to about 27 μm. The core is doped to define a peak relative refractive index $\Delta_{1,MAX} > 0$. A cladding surrounds and is directly adjacent to the core, the cladding comprises a depressed-index region having a minimum relative refractive index $\Delta_{3,MIN} < 0$ and a width $w_1$. The width $w_1$ is in a range of from about 4 μm to about 5 μm. The multimode optical fiber has a peak wavelength $\lambda_P$ at which the multimode optical fiber has a maximum bandwidth. The peak wavelength $\lambda_P$ is a function of at least one of the peak relative refractive index $\Delta_{1,MAX}$, the core radius $r_1$, the width $w_1$ of the depressed-index region, and the minimum relative refractive index $\Delta_{3,MIN}$.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Figure 1:
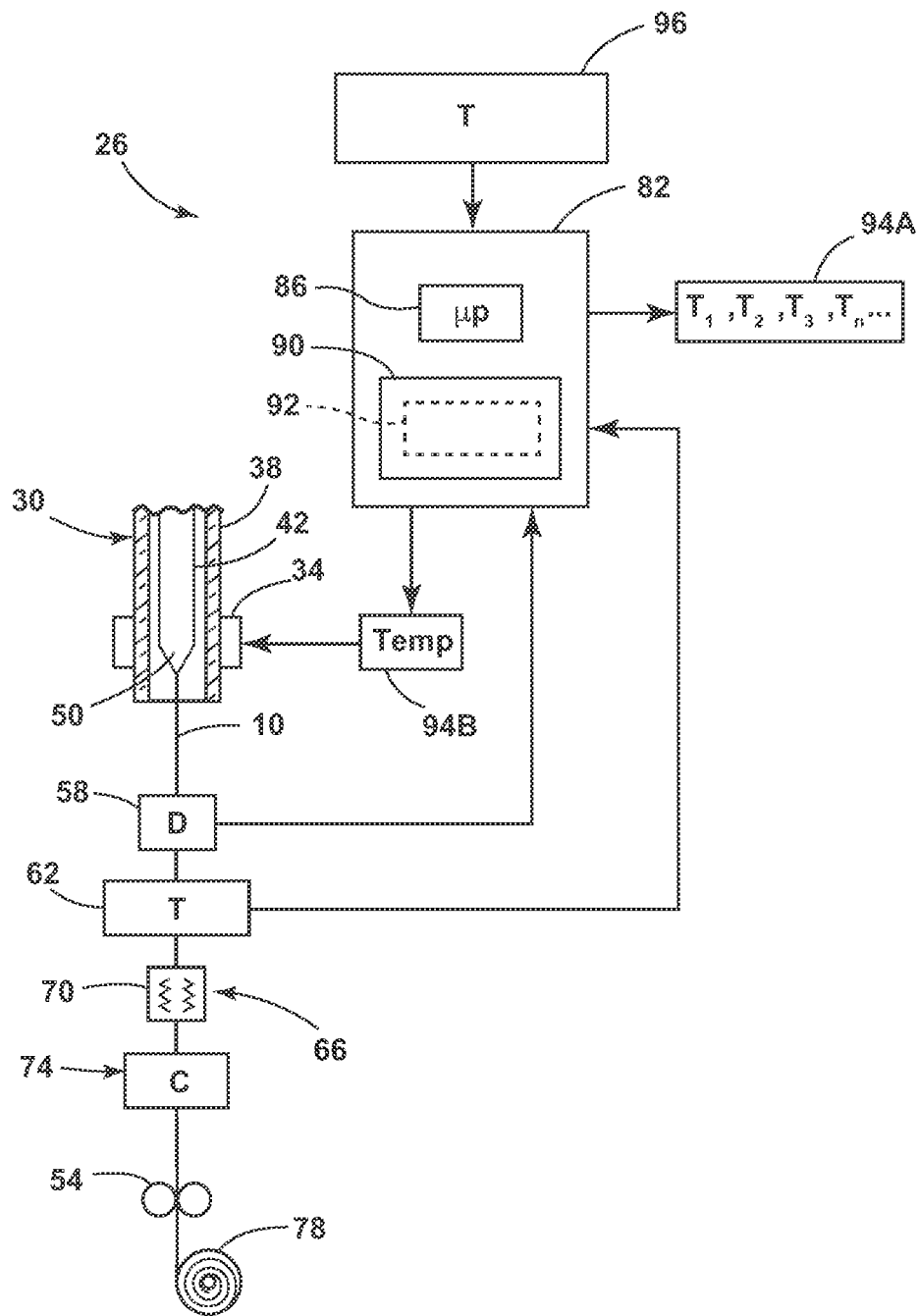
FIG. 1 is a schematic diagram of a production system for an optical fiber, according to one example.

Additional features and advantages will be set forth in the detailed description that follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

The multimode optical fiber, also referred to as the optical fiber, disclosed herein is considered to be an optical fiber having light traveling in a core in a plurality of rays, also called modes. Often, multimode optical fibers have larger cores relative to single mode optical fibers, where light typically travels in one ray. The multimode optical fiber may include both step-index and graded-index multimode optical fibers. Moreover, for example, the core of the multimode optical fiber may have a diameter in a range of from about 50 µm to about 65 µm. "Radial position," "radial distance," or the radial coordinate "r" refers to radial position relative to the centerline (r=0) of the core in the optical fiber. The length dimension "micron" may be referred to herein as micron or om.

The "refractive index profile" is the relationship between refractive index, or relative refractive index, and the radial distance r from the centerline of the core. For relative refractive index profiles depicted herein as having step boundaries between adjacent cladding regions, normal variations in processing conditions may preclude obtaining sharp step boundaries at the interface of adjacent regions. It is to be understood that although boundaries of refractive index profiles may be depicted herein as step changes in the refractive index, the boundaries in practice may be rounded, or otherwise deviate from perfect step function characteristics. It is further understood that the value of the relative refractive index may vary with radial position within the core region and/or any of the cladding regions. When relative refractive index varies with radial position in a particular region of the fiber (core region and/or any of the cladding regions), it may be expressed in terms of its actual or approximate functional dependence or in terms of an average value applicable to the region. Unless otherwise specified, if the relative refractive index of a region (core region and/or any of the cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

The "relative refractive index" or "relative refractive index percent" as used herein with respect to multimode optical fibers and fiber cores of multimode optical fibers is defined as:

$$\Delta\% = 100\frac{n^2(r) - n_c^2}{2n^2(r)}$$

where n(r) is the refractive index at the radial distance r from the centerline of the core, unless otherwise specified, and $n_c$ is about 1.444, which is the refractive index of undoped silica glass at a wavelength of 1550 nm. As used herein, the relative refractive index is represented by Δ (or "delta") or Δ % (or "delta %") and its values are given in units of "%" unless otherwise specified. Relative refractive index may also be expressed as Δ(r) or Δ(r) %. When the refractive index of a region is less than the reference index $n_c$, the relative refractive index is negative and can be referred to as a depressed-index region, a trench, or a moat. When the refractive index of a region is greater than the reference index $n_c$, the relative refractive index is positive and the region can be said to be raised or to have a positive index.

Moreover, the term "α-profile," also referred to as an "alpha profile", refers to a relative refractive index profile Δ(r) that has the following functional form:

$$\Delta(r) = \Delta(r_0)\left[1 - \frac{|r - r_0|}{(r_1 - r_0)}\right]^\alpha$$

where $r_o$ is the point at which Δ(r) is maximum, $r_1$ is the point at which Δ(r) is zero, and r is in the range $r_i \leq r \leq r_f$, where $r_i$ is the initial point of the α-profile, $r_f$ is the point of the α-profile, and a is a real number. In some embodiments, examples shown herein can have a core alpha of $1 \leq \alpha \leq 100$. In practice, even when the target profile is an alpha profile, some level of deviation from the ideal configuration can occur. Therefore, the alpha parameter for an optical fiber may be obtained from the best fit of the measured index profile, as is known in the art.

With reference to FIGS. 1-15, reference numeral 10 generally refers to a multimode optical fiber includes a core 14 having a core radius $r_1$ in a range of from about 25 µm to about 27 µm. The core 14 is doped to define a peak relative refractive index $\Delta_{1,MAX} > 0$. A cladding 22 surrounds and is directly adjacent to the core 14, the cladding 22 comprises a depressed-index region 18 having a minimum relative refractive index $\Delta_{3,MIN} < 0$ and a width $w_1$. The width $w_1$ is in a range of from about 4 µm to about 5 µm. The multimode optical fiber 10 has a peak wavelength $\lambda_P$ at which the multimode optical fiber 10 has a maximum bandwidth. The peak wavelength $\lambda_P$ is a function of at least one of the peak relative refractive index $\Delta_{1,MAX}$, the core radius $r_1$, the width $w_1$ of the depressed-index region 18, and the minimum relative refractive index $\Delta_{3,MIN}$.

Referring to FIG. 1, a production system 26 may include a draw furnace 30 that includes a heating element 34 and a muffle 38 that is heated to a temperature in a range of from about 1700° C. to about 2100° C. A preform 42 may be disposed substantially vertically in the muffle 38 of the draw furnace 30. In various examples, the preform 42 may include glass materials and/or silica-based glass materials. Additionally or alternatively, the preform 42 may be doped or otherwise processed for manufacture into the optical fiber 10.

Figure 4:
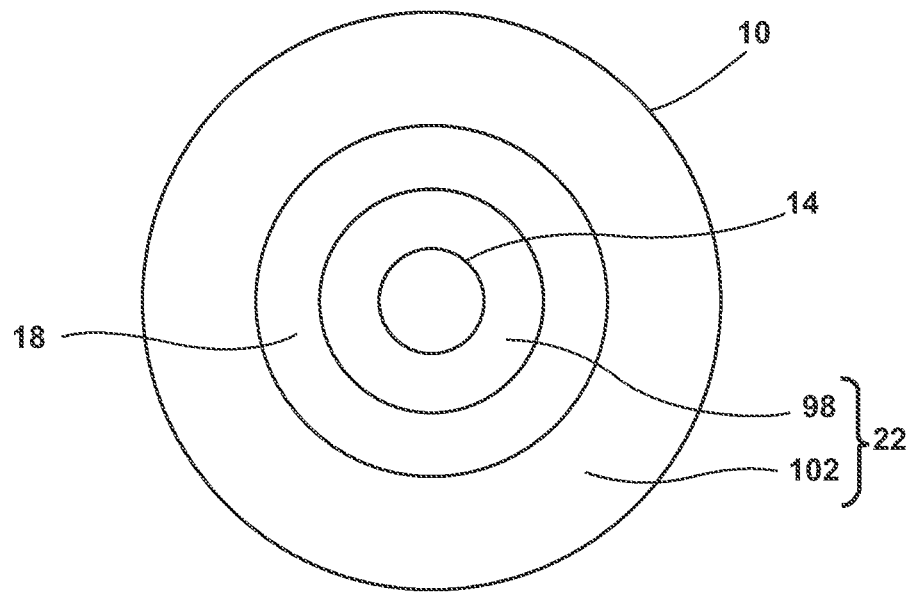
FIG. 4 is a cross-sectional view of an optical fiber, according to one example.

According to various aspects, the preform 42 may include a doped core 14 and the cladding 22 (FIG. 4). The cladding 22 may include fluorine. A dopant may be used to increase or decrease a relative refractive index Δ % of the core 14 relative to pure silica glass. In various examples, the core 14 may include of doped silica. As used herein, up-dopant is used to refer to a dopant that increases the relative refractive index Δ % relative to pure, undoped silica glass. Non-limiting examples of up-dopants include chlorine ("Cl"), bromine ("Br"), germanium dioxide ("GeO$_2$"), aluminum trioxide ("Al$_2$O$_3$"), phosphorus pentoxide ("P$_2$O$_5$"), and titanium dioxide ("TiO$_2$"). As used herein, down-dopant is used to refer to a dopant that decreases the refractive index relative to pure, undoped silica glass. Non-limiting examples of down-dopants include fluorine ("F") and boron ("B"). Alternatively, the core 14 may not be doped. The cladding 22 may include an annular ring of doped silica, including, for example, fluorine doped silica.

In various examples, the preform 42 may be in the form of a single preform 42 for drawing multiple optical fibers 10 or may include a plurality of preforms 42 formed from the same core preform 42. Additionally or alternatively, the preform 42 may be an entire core preform 42 having the core 14 with the cladding 22, or may be any optical fiber preform 42 produced from the original core preform 42, commonly referred to as the core 14 having the cladding 22. Typically, more than one preform 42 may be formed from a single core preform 42. It is contemplated that each preform 42 may have a different refractive index measurement.

Referring still to FIG. 1, the optical fiber 10 may be drawn from the heated preform 42 in the form of a bare optical fiber 10 not having a protective coating layer (e.g., prior to being coated with a polymeric-based material). The heating element 34 supplies heat to at least a portion of the preform 42. In various examples, the optical fiber 10 may be pulled from a root portion 50 of the preform 42 by a tractor 54. After leaving the muffle 38, the optical fiber 10 may encounter a diameter monitoring device 58, which may provide a signal that is used in a feedback control loop to regulate the speed of the tractor 54 to maintain a substantially constant diameter of the optical fiber 10. The optical fiber 10 may then pass through a fiber tension measurement device 62 that measures draw tension T of the optical fiber 10 and provides a feedback control loop to regulate the draw tension T of the optical fiber 10 to maintain a selected draw tension T. As used herein, the draw tension T is provided in units of grams (g). However, it is understood that the draw tension T measurements provided in grams may be converted to tension measurements in Newtons or dynes.

The production system 26 may include a cooling system 66. Once the optical fiber 10 is drawn from the preform 42, the optical fiber 10 may be cooled in a cooling tube 70 or other device. The cooling system 66 may be coupled to, or alternatively, spaced-apart from an exit of the furnace 30. The optical fiber 10 may subsequently be coated by a coating system 74, which may apply a polymeric-based coating material to an outside surface of the optical fiber 10. It is also contemplated that the coated optical fiber 10 may pass through a coating curing apparatus after the coating system 74. The coated optical fiber 10 may be wound onto a reel or spool 78.

The production system 26 is illustrated having a controller 82, which may have a microprocessor or a processor 86 and a memory 90. The memory 90 may store instructions 92 executable by the processor 86. It is contemplated that any digital and/or analog processing circuitry and memory storage medium may be employed. The controller 82 may receive an output from the diameter monitoring device 58 and a tension output 94A of the fiber tension measurement device 62 and may process the tension outputs 94A with one or more routines. The controller 82 may also provide the tension output 94A to a display or other human machine interface (HMI) for a user to view tension values corresponding with the draw tension T of each optical fiber 10 wound on each reel 78 (e.g., $T_1$, $T_2$, $T_3$, etc.).

A selected draw tension T may be provided as an input 96 to the controller 82 to allow a user to select the draw tension T. The controller 82 may generate a temperature control output 94B in response to the user-selected draw tension T, which can be used to control the temperature of the heating element 34 in the furnace 30. The temperature control output 94B may adjust the temperature of the furnace 30 to achieve the selected draw tension T. Moreover, the user can adjust the draw tension T to an adjustment tension ΔT based on the tension output 94A and/or other aspects of the optical fiber 10. Typically, an increase in the temperature of the furnace 30 can cause a decrease in the draw tension T of the drawn optical fiber 10. A decrease in the temperature of the furnace 30 can cause an increase in the draw tension T of the drawn optical fiber 10. The temperature of the furnace 30 may be adjusted with a feedback loop until the draw tension T corresponds with the user-selected draw tension T. In various examples, the draw tension T of the drawn optical fiber 10 may be adjusted by adjusting the speed of the optical fiber 10 drawn by the tractor 54, which may be controlled by the controller 82 in response to the user-selected draw tension T and/or the adjustment tension ΔT.

According to various aspects, the draw tension T may induce mechanical stress in the optical fiber 10, which can change a refractive index profile. The change in refractive index profile can be equated to an effective change in the alpha-value of the refractive index profile. The alpha-profile for a given optical fiber 10 can be measured using the refractive near field (RNF) or Mach-Zehnder interferometry measurement techniques. For example, a refractive index measurement technique may include a Preform Analyzer refractive index measurement system manufactured by Photon Kinetics Instruments. The refractive index profile for a given optical fiber 10 can also be modeled using the input parameters of a chemical composition and glass transition radial profile, outer optical fiber diameter, draw tension T, and/or stress-optic coefficients.

Figure 2:
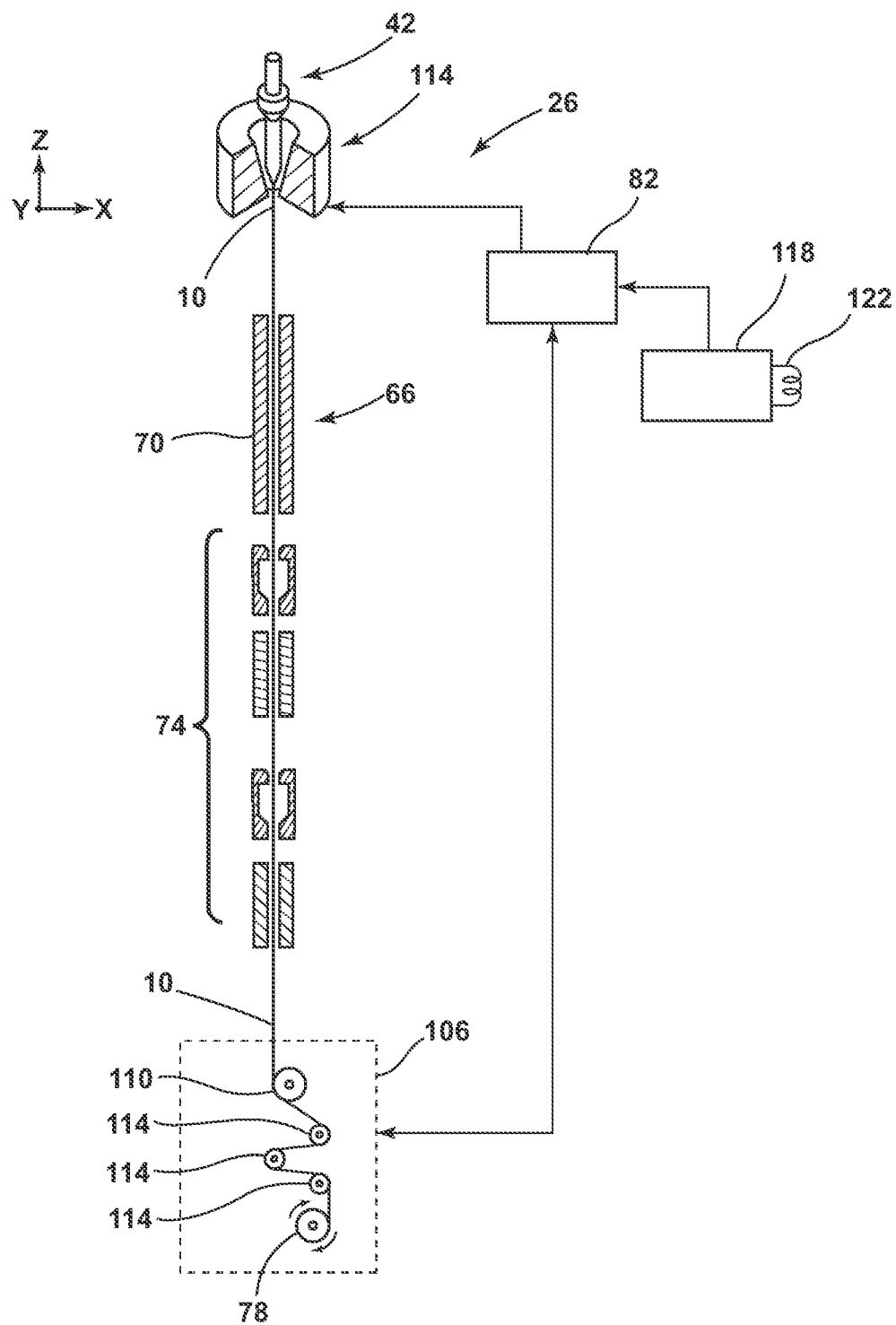
FIG. 2 is a schematic diagram of a production system for an optical fiber, according to one example.

The production system 26, as illustrated in FIGS. 1 and 2, may produce the optical fiber 10, or a plurality of optical fibers 10, having the core 14, with the depressed-index region 18, and the cladding 22. The cladding 22 may have an inner cladding 98 and an outer cladding 102, which may be separated by the depressed-index region 18 (FIG. 4). The depressed-index region 18 may be a low index layer of silica around the core 14. Additionally or alternatively, the depressed-index region 18 may guide and/or reflect light lost from the core 14 back into the core 14, which can reduce bending losses of the optical fiber 10. The cladding 22 may include lower refractive index materials compared to the core 14. The cladding 22, including the inner and outer claddings 98, 102, may cause light to be confined to the core 14 through internal reflection at the boundary between the core 14 and the cladding 22.

The amount of dopant in the silica glass can be selected to provide the cladding 22 with one or more selected characteristics, non-limiting examples of which include relative refractive index and viscosity. According to one aspect of the present disclosure, the inner and/or outer claddings 98, 102 include silica glass doped with chlorine. In one example, an amount of chlorine dopant in the silica glass is from about 0 wt % to about 2 wt %, about 0.01 wt % to about 2 wt %, about 0.1 wt % to about 2 wt %, about 0.5 wt % to about 2 wt %, about 1 wt % to about 2 wt %, about 1.5 wt % to about 2 wt %, 0 wt % to about 1.5 wt %, about 0.01 wt % to about 1.5 wt %, about 0.1 wt % to about 1.5 wt %, about 0.5 wt % to about 1.5 wt %, about 1 wt % to about 1.5 wt %, 0 wt % to about 1 wt %, about 0.01 wt % to about 1 wt %, about 0.1 wt % to about 1 wt %, about 0.5 wt % to about 1 wt %, 0 wt % to about 0.5 wt %, about 0.01 wt % to about 0.5 wt %, or about 0.1 wt % to about 0.5 wt %. According to one aspect of the present disclosure, the inner and/or outer claddings 98, 102 include silica glass doped with fluorine. In one example, an amount of fluorine dopant in the silica glass is from about 0 wt % to about 2 wt %, about 0.01 wt % to about 2 wt %, about 0.1 wt % to about 2 wt %, about 0.5 wt % to about 2 wt %, about 1 wt % to about 2 wt %, about 1.5 wt % to about 2 wt %, 0 wt % to about 1.5 wt %, about 0.01 wt % to about 1.5 wt %, about 0.1 wt % to about 1.5 wt %, about 0.5 wt % to about 1.5 wt %, about 1 wt % to about 1.5 wt %, 0 wt % to about 1 wt %, about 0.01 wt % to about 1 wt %, about 0.1 wt % to about 1 wt %, about 0.5 wt % to about 1 wt %, 0 wt % to about 0.5 wt %, about 0.01 wt % to about 0.5 wt %, or about 0.1 wt % to about 0.5 wt %.

The inner and/or outer claddings 98, 102 can have a relative refractive index $\Delta_C$ of from about −0.25% to about 0.1%. For example, the inner and/or outer claddings 98, 102 can have a relative refractive index $\Delta_C$ of from about −0.25% to about 0.1%, about −0.2% to about 0.1%, about −0.15% to about 0.1%, about −0.1% to about 0.1%, about −0.05% to about 0.1%, about −0.025% to about 0.1%, about 0% to about 0.1%, about 0.025% to about 0.1%, about 0.05% to about 0.1%, about −0.25% to about 0.05%, about −0.2% to about 0.05%, about −0.15% to about 0.05%, about −0.1% to about 0.05%, about −0.05% to about 0.05%, about −0.025% to about 0.05%, about 0% to about 0.05%, about 0.025% to about 0.05%, about −0.25% to about 0.025%, about −0.2% to about 0.025%, about −0.15% to about 0.025%, about −0.1% to about 0.025%, about −0.05% to about 0.025%, about −0.025% to about 0.025%, about 0% to about 0.025%, about −0.25% to about 0%, about −0.2% to about 0%, about −0.15% to about 0%, about −0.1% to about 0%, about −0.05% to about 0%, or about −0.025% to about 0%.

Referring to FIG. 2, an additional and/or alternative example of the production system 26 is illustrated. The production system 26 may include a fiber draw system 106. The fiber draw system 106 may modify the process for manufacturing the optical fiber 10. The controller 82 may be operably coupled to the furnace 30 and/or the fiber draw system 106. The controller 82 may modify the manufacturing processes, such as, for example, by adjusting a drawing speed of the fiber draw system 106, modifying the temperature of the furnace 30, and/or modifying the draw tension T applied to the optical fiber 10. The fiber draw system 106 may utilize various drawing mechanisms 110 and/or pulleys 114 to provide the selected draw tension T to the multimode optical fiber 10 as the multimode optical fiber 10 is drawn through the production system 26.

The production system 26 may include a wavelength determination system 118, which may determine a peak wavelength $\lambda_P$ of a test portion 122 of the optical fiber 10. In various aspects, the peak wavelength $\lambda_P$ may be a predicted peak wavelength, a measured peak wavelength, or a combination thereof. The peak wavelength $\lambda_P$ corresponds to a wavelength at which the multimode optical fiber 10 has a maximum bandwidth. The wavelength determination system 118 may include the processor 86 communicatively coupled to the memory 90. The memory 90 may include computer-readable and executable routines or instructions 92 (FIG. 1), which are executed by the processor 86 to determine the peak wavelength $\lambda_P$ of the test portion 122. The test portion 122 may be provided for use in the wavelength determination system 118 by separating a multimode optical fiber 10 test segment from the drawn multimode optical fiber 10. The separated multimode optical fiber 10 test segment may then be coupled to the wavelength determination system 118 (e.g., via mechanical splicing or fusion splicing) so that the peak wavelength $\lambda_P$ of the test portion 122 may be determined.

The test portion 122 may be transferred to the reel 78 before coupling the test portion 122 to the wavelength determination system 118. The test portion 122 may be obtained at the initiation of the drawing process. In various examples, the test portion 122 may be separated and coupled to the wavelength determination system 118. For example, the test portion 122 may be drawn during a single process run and wound to multiple spools (e.g., using an indexing winder) and the test portion 122 may be separated during a spool change. Additionally or alternatively, the test portion 122 may be separated and coupled to the wavelength determination system 118 at predefined intervals, such as once per 20 km, once per 30 km, once per 50 km, or at any other interval. In various examples, the wavelength determination system 118 may determine the peak wavelength $\lambda_P$ of the drawn optical fiber 10 substantially in real-time as the optical fiber 10 is drawn.

Figure 3:
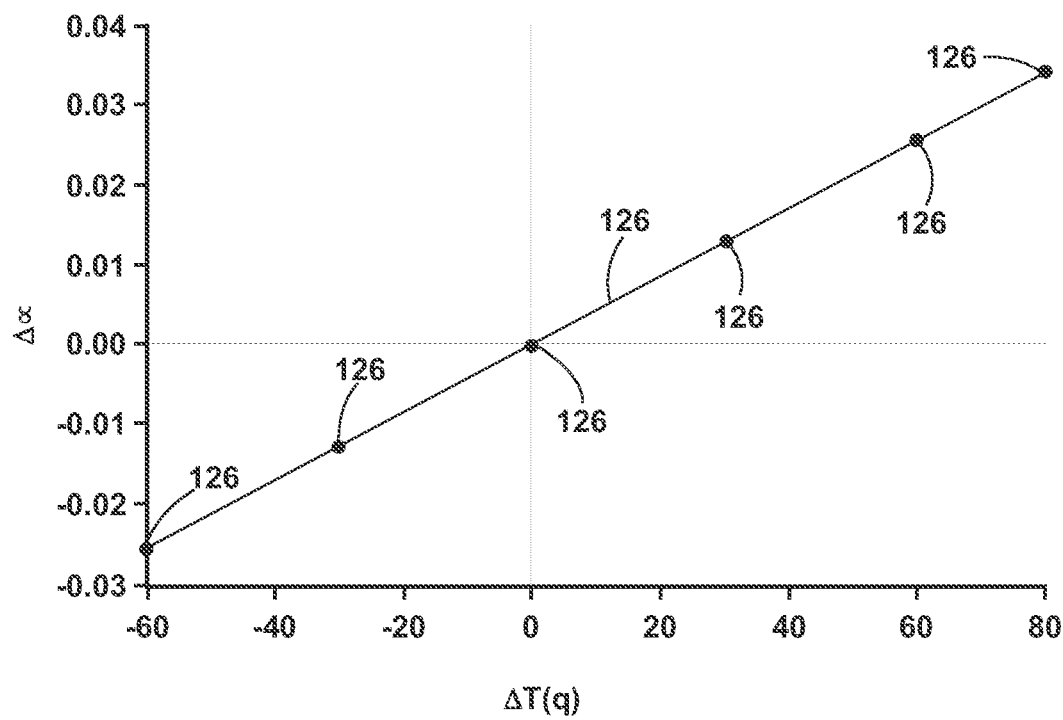
FIG. 3 is a graph illustrating changes in the index α-profile with changes in fiber draw tension, according to one example.

Referring to FIG. 3, the impact caused by changes in the draw tension T on the alpha-value is illustrated, according to one example. In this example, the optical fiber 10 has a graded-index $GeO_2$ doped silica core 14 with 1% relative refractive index relative to a silica outer cladding 102, an alpha of about 2.1, and a core radius of about 25 µm. Further, in this example, the overall optical fiber 10 is about 125 µm in diameter. As illustrated in FIG. 3, the measured effective alpha-value changes as a function of draw tension T changes. In this example, for each 100 gram change in the draw tension T, the effective α-value changes by about 0.043, as illustrated by points 126 on line 130 on the illustrated graph. By changing the draw tension T, the alpha-profile value can be changed to achieve the maximum bandwidth for the optical fiber 10. Optical fibers 10 having a different radial chemical composition can have a different slope of change in alpha with change in the draw tension T. For example, an optical fiber 10 may have a graded-index $GeO_2$ doped silica core 14 and a cladding 22 of pure silica containing a fluorine doped low index ring. In this example, the relative refractive index Δ % of the core 14 may be about 0.94% relative to the silica cladding 22 with an alpha of about 2.1. The ring may be about 1 µm offset to the core 14 with a refractive index change of about −0.45% and a radius of about 5 µm, and a silica outer cladding 102. In this example, for each 100 gram change in draw tension T, the effective α-value changes by about 0.026. In this way, a selected alpha profile can be achieved to provide for a tuned preform 42 and/or optical fiber 10.

Referring to FIGS. 4 and 8-10, the optical fiber 10 manufactured by the production system 26 may have a substantially circular and/or oblong cross-sectional shape after being processed through the production system 26. When the optical fiber 10 has a circular cross-sectional shape, the core 14 may have the core radius $r_1$ in a range of from about 20 µm to about 35 µm, in a range of from about 25 µm to about 30 µm, in a range of from about 25 µm to about 27 µm, or any value therebetween. The cladding 22 surrounds and is directly adjacent to the core 14, As such, the inner cladding 98 may be disposed adjacent to the core 14. In various examples, the inner cladding 98 has a width that combined with the core radius $r_1$ forms an inner cladding radius $r_2$. The inner cladding radius $r_2$ may be in a range of from about 25 µm to about 35 µm, in a range of from about 25 µm to about 30 µm, in a range of from about 27 µm to about 30 µm, or any value therebetween.

The depressed-index region 18 may be disposed adjacent to the inner cladding 98. The depressed-index region 18 has a volume v, which includes a width $w_1$ and a depth d of the depressed-index region 18. The depressed-index region 18 may have the depressed-index region width $w_1$ and/or a depth d in a range of from about 3 µm to about 6 µm, in a range of from about 4 µm to about 6 µm, a range of from about 4 µm to about 5 µm, or any value therebetween. Accordingly, the core 14, the inner cladding 98, and the depressed-index region 18 may produce a depressed-index region radius $r_3$. The depressed-index region radius $r_3$ may be in a range of from about 25 µm to about 50 µm, a range of from about 30 µm to about 45 µm, a range of from about 35 µm to about 40 µm, or any value therebetween. The outer cladding 102 may be disposed adjacent to the depressed-index region 18. The outer cladding 102 may have a width $w_2$ which may be in a range of from about 25 µm to about 50 µm, which can at least partially define an outer cladding radius $r_4$. The outer cladding radius $r_4$ may be in a range of from about 45 to about 125 µm, a range of from about 50 µm to about 100 µm, a range of from about 75 µm to about 100 µm, or any value therebetween. The ranges provided herein may be adjusted based on the selected properties of the optical fiber 10 and, therefore, should be considered non-limiting examples.

Figure 5:
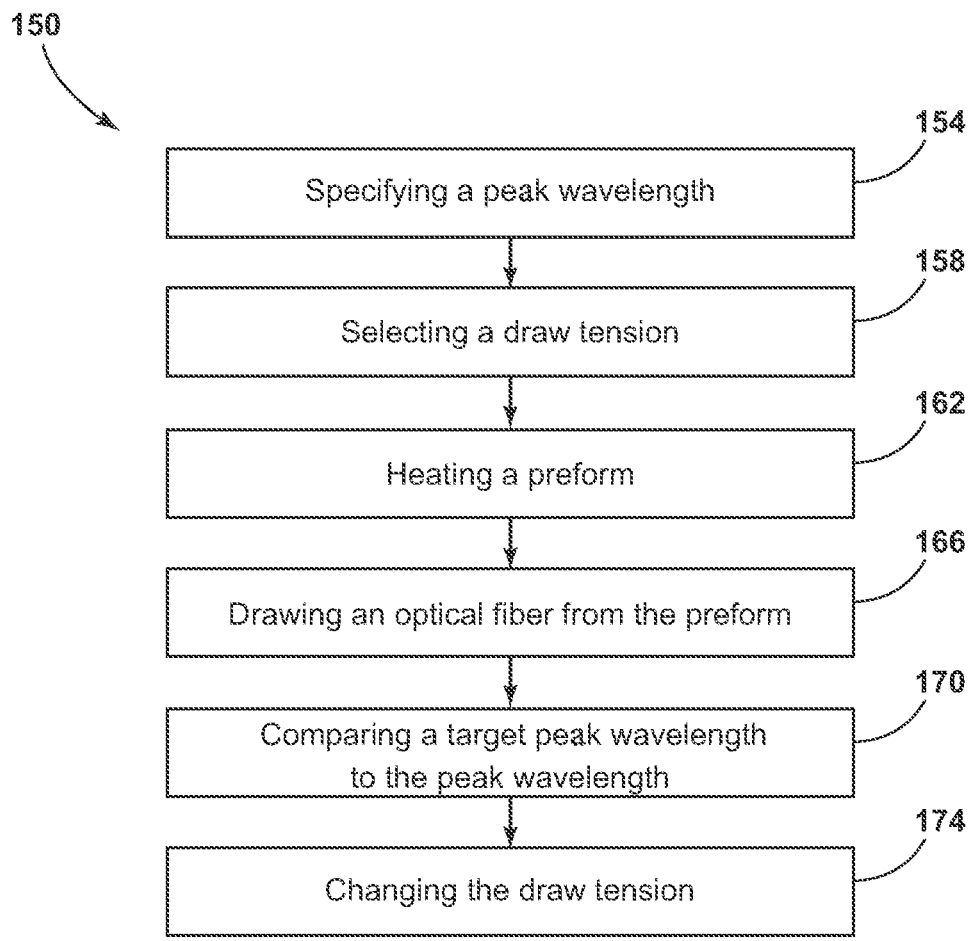
FIG. 5 is a flow diagram of a method of manufacturing an optical fiber, according to one example.

The production systems 26, as illustrated in FIGS. 1 and 2, may be used in a method 150 of manufacturing the optical fiber 10, as illustrated in FIG. 5 and with further reference to FIGS. 4 and 6-10. The method 150 may include step 154 of specifying and selecting the peak wavelength $\lambda_P$ for the multimode optical fiber 10. The peak wavelength $\lambda_P$ is the wavelength at which the optical fiber 10 has a maximum bandwidth. The optical fiber 10 may be produced in order to have the bandwidth exceeding a bandwidth threshold at the peak wavelength $\lambda_P$. In various examples, the peak wavelength $\lambda_P$ may be in a range of from about 780 nm and 1650 nm, a range of from about 980 nm to about 1060 nm, a range of from about 1260 nm and about 1360 nm, a range of from about 1300 nm and 1320 nm, or any wavelength value therebetween. However, it is understood optical fibers 10 may be produced in order to have any peak wavelength $\lambda_P$.

In step 158, the draw tension T is selected for the optical fiber 10 based on a correlation relating the peak wavelength $\lambda_P$ to the draw tension T. The correlation includes the correlation constant K, which may be a function of at least one of the maximum refractive index $\Delta_{1,MAX}$, the core radius $r_1$, the volume v of the depressed-index region 18, the minimum refractive index value $\Delta_{3,MIN}$, and the peak wavelength $\lambda_P$. The draw tension T may be in a range of from about 45 g to about 220 g. In this way, the draw tension T may span a range of approximately 175 g.

In step 162, the preform 42 may be heated in the furnace 30. The preform 42 includes a core and a cladding. A depressed-index region may surround the core and may operate to reflect light back into the core. The depressed-index region may be configured as an annular ring of lower index glass surrounding the core. The selected geometry of the depressed-index region may maximize reflection of light back into the core.

In step 166, the optical fiber 10 is drawn from the preform 42 at the draw tension T. The optical fiber 10 includes the core 14 and the cladding 22 surrounding and directly adjacent to the core 14. The core 14 has a radius $r_1$ and a maximum refractive index value $\Delta_{1,MAX}$ greater than zero percent. The cladding 22 includes the depressed-index region 18, which has a minimum refractive index value $\Delta_{3,MIN}$ less than zero percent. Further, the depressed-index region 18 has a volume v, including the width $w_1$ and the depth d.

In non-limiting examples, the core radius $r_1$ may be in a range of from about 24 µm to about 27 µm. The moat width $w_1$ may be in a range of from about 4 µm to about 9 µm. Additionally or alternatively, the relative refractive index Δ % may be adjusted through up-doping or down-doping the core 14 to produce different peak deltas $\Delta_{1,MAX}$ and minimum deltas $\Delta_{3,MIN}$ relative to a relative refractive index of undoped silica glass (e.g., a delta of about 0%). The peak delta $\Delta_{1,MAX}$ may be the highest relative refractive index relative to undoped silica glass. The peak delta $\Delta_{1,MAX}$ may be formed by up-doping the core 14. The alpha-profile of the core 14 may be the relative refractive index $\Delta$ % indicated in a refractive index profile as a parabolic curve between the peak delta $\Delta_{1,MAX}$ and a delta of about 0%. In various examples, the peak delta $\Delta_{1,MAX}$ may be in a range of from about 0.93% to about 1.02%. Moreover, the minimum delta $\Delta_{MIN}$ may be defined in the depressed-index region 18. The minimum delta $\Delta_{MIN}$ may be in a range of from about −0.2% to about −0.3%.

In step 170, the peak wavelength $\lambda_P$ of the optical fiber 10 may be compared to a selected target peak wavelength $\lambda_{P,target}$. The selected target peak wavelength $\lambda_{P,target}$ may be in a range of from about 780 nm and 1650 nm, a range of from about 980 nm to about 1060 nm, a range of from about 1260 nm and about 1360 nm, a range of from about 1300 nm and 1320 nm, or any wavelength value therebetween. Step 170 may include comparing the peak wavelength $\lambda_P$ to the target peak wavelength $\lambda_{P,target}$. As such, during the draw process, the peak wavelength $\lambda_P$ of the optical fiber 10 may differ from the selected target peak wavelength $\lambda_{P,target}$. The peak wavelength $\lambda_P$, may differ from the selected target peak wavelength $\lambda_{P,target}$ by a difference magnitude $\Delta\lambda_P$ given by $\Delta\lambda_P = |\lambda_P - \lambda_{P,target}|$.

In step 174, the draw tension T can be changed to an adjustment tension $\Delta T$. The adjustment tension $\Delta T$ may be selected to vary and/or adjust the peak wavelength $\lambda_P$. The adjustment tension $\Delta T$ may additionally or alternatively be selected to reduce the difference magnitude $\Delta\lambda_P$. The adjustment tension $\Delta T$ may be in a range of from about 45 g to about 220 g. As such, the adjustment tension $\Delta T$ may span a range of about 175 g. The selection of the adjustment tension $\Delta T$ may be based on the correlation relating the adjustment tension $\Delta T$ to the difference magnitude $\Delta\lambda_P$. The correlation may include the correlation constant K, which may be a function of at least one of the maximum refractive index $\Delta_{1,MAX}$, the core radius $r_1$, the volume v of the depressed-index region 18, the minimum refractive index value $\Delta_{3,MIN}$, the peak wavelength $\lambda_P$, and the target peak wavelength $\lambda_{P,target}$.

The method 150 can produce an optical fiber 10 having the peak wavelength $\lambda_P$ within a tuning range. The running range may account for differences in separate preforms 42, as well as provide for tenability of the optical fiber 10 to different peak wavelengths $\lambda_P$ within the tuning range. According to various aspects, parameters of the optical fiber 10 may be adjusted to alter the peak wavelength $\lambda_P$ and the tuning range. In this way, the peak wavelength $\lambda_P$ can be tuned to the target peak wavelength $\lambda_{P,target}$ based on a variety of parameters of the optical fiber 10, the draw tension T, and the adjustment tension $\Delta T$. The parameters include at least the core radius $r_1$, the volume v of the depressed-index region 18, the relative refractive index $\Delta$ %, the peak wavelength $\lambda_P$, the target peak wavelength $\lambda_{P,target}$.

According to various aspects, the peak wavelength $\lambda_P$ and the tuning range of the optical fiber 10 can be adjusted. The peak wavelength $\lambda_P$ may tuned based on the selected drawing tension T and the adjustment tension $\Delta T$ in relation to various parameters of optical fiber 10. Stated differently, change in the peak wavelength $\lambda_P$ may be correlated with the change in the draw tension $\Delta T$, given as $\Delta LP = K \cdot \Delta T$, where K the correlation constant that is a function of at least one of the various parameters of the optical fiber 10. The correlation constant K may be defined in a range of from about −0.5 nm/g to about −3.5 nm/g, about −1.5 nm/g to about −3.5 nm/g, about −1.9 nm/g to about −3.3 nm/g, and/or combinations therebetween. The peak wavelength $\lambda_P$ can be tuned, through the method 150, to any selected target peak wavelength $\lambda_{P,target}$, which may be in the tuning range. The tuning range may be defined between $\lambda_1$ and $\lambda_2$. In various examples, $\lambda_1$ may be about 675 nm and $\lambda_2$ may be about 1025 nm.

The method 150 disclosed herein may provide for optical fibers 10 having a variety of parameters, Moreover, the method 150 can produce optical fibers 10 having different peak wavelengths $\lambda_P$, as well as different tuning ranges. This method 150 may be advantageous for using the same, or substantially the same, production system 26 for manufacturing optical fibers 10 having differing peak wavelength $\lambda_P$ and different tuning ranges. This may be advantageous for reducing manufacturing and production costs, as well as maximizing the utility of the production system 26. Accordingly, the method 150 may utilize the preform 42 capable of withstanding a change into optical fibers 10 having the differing selected fiber parameters.

EXAMPLES

The following examples describe various features and advantages provided by the disclosure, and are in no way intended to limit the disclosure and appended claims.

Figure 6:
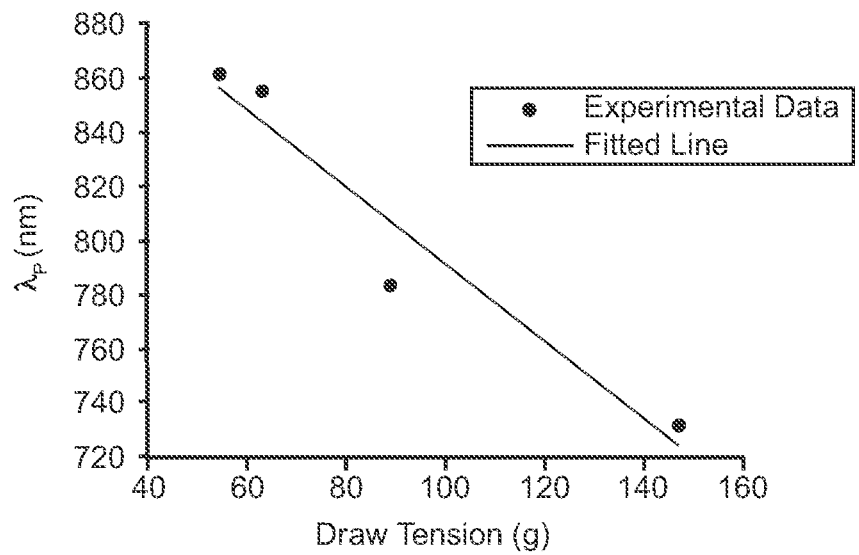
FIG. 6 is a graph that schematically illustrates a function defining a relationship between draw tension T and a peak wavelength $\lambda_P$, according to one example.

Referring to FIG. 6, a relationship between the selected draw tension T and the peak wavelength $\lambda_P$ can be established by fitting the peak wavelength $\lambda_P$ and tension T data for each optical fiber 10. For example, the exemplary fitted line illustrated in FIG. 6 can be described by the equation $\lambda_P = d + K \cdot \Delta T$, where $\lambda_P$ is the peak wavelength $\lambda_P$, d is about 33.69, K is about −1.45 nm/g, and $\Delta T$ is the draw tension T. Stated differently, the relationship between the peak wavelength $\lambda_P$ and draw tension T can be described as the following exemplary equation: $\lambda_P = -1.45 \cdot \Delta T$. In this way, the relationship can between the selected draw tension T and the peak wavelength $\lambda_P$ can be described using a linear function equation. While the peak wavelength $\lambda_P$ to draw tension T relationship illustrated in FIG. 6 is a fitted line, it is understood that in other embodiments, the relationship between the peak wavelength $\lambda_P$ and draw tension T may not be a linear function, such as in examples in which the peak wavelength $\lambda_P$ and draw tension T are related by a non-linear function or a look-up table.

Figure 7:
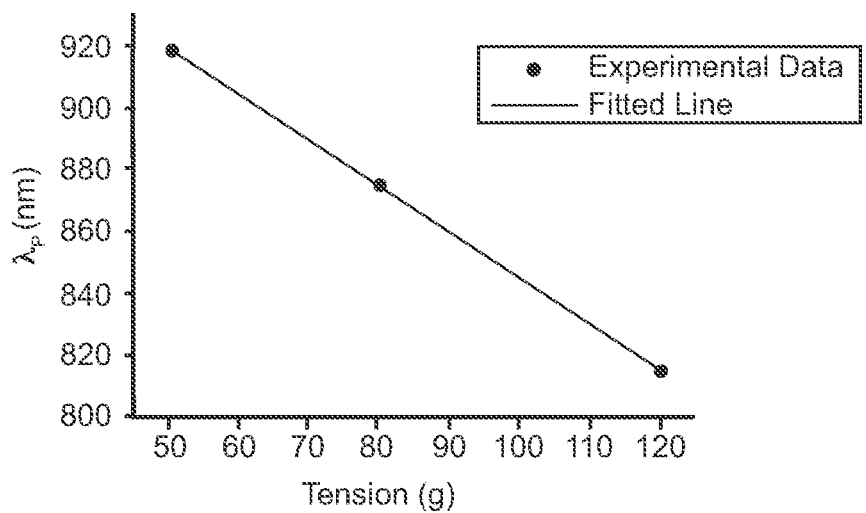
FIG. 7 is a graph that schematically illustrates a function defining a relationship between draw tension T and a peak wavelength $\lambda_P$, according to one example.

Referring to FIG. 7, an additional and/or alternative relationship between the selected draw tension T and the peak wavelength $\lambda_P$ is illustrated. As previously explained, the coefficient K is affected by the parameters of the optical fiber 10. The relationship between the draw tension T and the peak wavelength $\lambda_P$ can be illustrated as a linear function (e.g., $y = mx + b$). In the non-limiting relationship illustrated in FIG. 7, the relationship between the draw tension T and the peak wavelength $\lambda_P$ may be described as $\lambda_P = 992 + (-1.473) \cdot \Delta T$, where 992 is the peak wavelength $\lambda_P$ when the draw tension T is 0 g (e.g., the y-intercept) and −1.473 (e.g., K) is the slope. As such, K is the slope defined by the relationship between the peak wavelength $\lambda_P$ and the selected draw tension T. The exemplary relationship illustrated in FIG. 7 was determined using an optical fiber 10 having a core delta of 1.2%, a core radius $r_1$ of 15.5 μm, and a depressed-index region width $w_1$ of 3.7 μm.

Figures 8, 9:
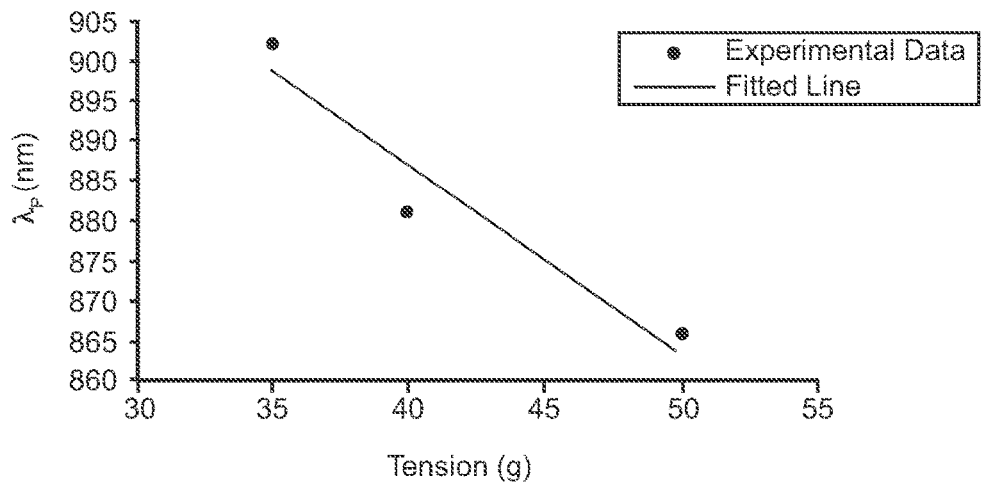
FIG. 8 is a graph that schematically illustrates a function defining a relationship between draw tension T and a peak wavelength $\lambda_P$, according to one example.
FIG. 9 is a table comparing a comparative example profile and example profiles of an optical fiber, according to one example.

Referring to FIG. 8, an additional and/or alternative relationship between the selected draw tension T and the peak wavelength $\lambda_P$ is illustrated with an up-doped optical fiber 10. As previously explained, the relationship between the draw tension T and the peak wavelength $\lambda_P$ can be illustrated as a linear function (e.g., y=mx+b). In the non-limiting relationship illustrated in FIG. 8, the relationship between the draw tension T and the peak wavelength $\lambda_P$ may be described as $\lambda_P$=977.64+(−2.2714)*$\Delta$T where 977.64 is the peak wavelength $\lambda_P$ when the draw tension T is 0 g (e.g., the y-intercept) and −2.2714 (e.g., K) is the slope. As such, K is the slope defined by the relationship between the peak wavelength $\lambda_P$ and the selected draw tension T. The exemplary relationship illustrated in FIG. 8 was determined using an optical fiber 10 having an up-doped cladding 22 with a 0.11% delta, a core delta of 0.98%, a core radius $r_1$ of 24.1 µm, and a depressed-index region width $w_1$ of 6.1 µm.

Moreover, it is understood that a function or relationship may be defined to relate peak wavelength $\lambda_P$ to the temperature of the drawing furnace 30 (FIG. 1) or any other process parameter that directly or indirectly influences draw tension T. As such, it is understood that the particular relationship between draw tension T and peak wavelength $\lambda_P$ may vary based on characteristics of the preform 42, the components of the production system 26, ambient conditions, drawing process parameters, and the like, but the particular relationship between draw tension T and peak wavelength $\lambda_P$ may be determined in the manner described herein for any set of conditions.

Referring to FIG. 9, the different properties and/or parameters of the optical fibers 10 produced by the method 150 are illustrated in example profiles of the optical fiber 10 compared to a comparative exemplary profile. As illustrated in the chart in FIG. 9, the comparative exemplary profile is illustrated as one example not produced by the method 150 disclosed herein. In various examples, the comparative exemplary profile may be a 50 µm bend-insensitive optical fiber 10.

Figure 10:
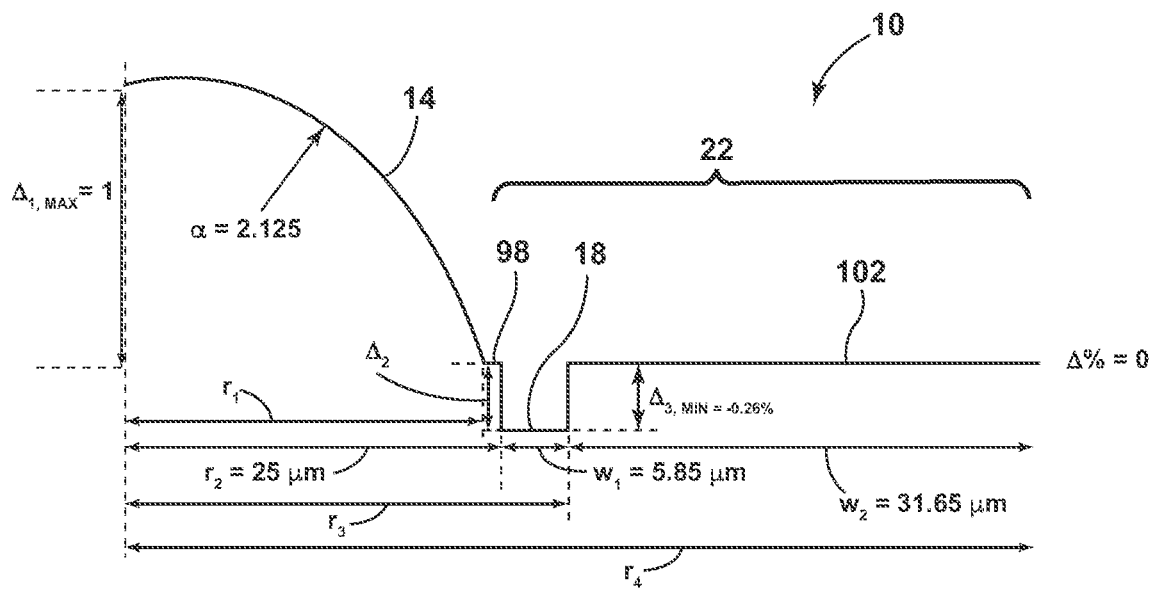
FIG. 10 is a refractive index profile for the comparative example optical fiber of claim 6.

Referring to FIGS. 9 and 10, the comparative exemplary profile includes the core radius $r_1$ of about 25 µm and the depressed-index region width $w_1$ of about 5.75 µm. The depressed-index region width $w_1$ may be in a range of from about 5.75 µm to about 5.85 µm. The relative refractive index $\Delta$ % of the comparative exemplary profile may be 0.98%. Further, the correlation constant K value (e.g., the coefficient affected by parameters of the optical fiber 10) may be about −1.43 nm/g. As indicated in the chart in FIG. 9, the tuning range of the comparative example profile extends between $\lambda_1$ and $\lambda_2$, where the difference between $\lambda_1$ and $\lambda_2$ is about 250 nm. In various examples, $\lambda_1$ may be about 725 nm and $\lambda_2$ be about 975 nm for a target peak wavelength $\lambda_{P,target}$ of about 850 nm. Moreover, the draw tension range $\Delta$T for producing the comparative exemplary profile fiber may extend between $T_1$ and $T_2$. The difference between $T_1$ and $T_2$ may be about 175 g. For example, $T_1$ may be about 45 g and $T_2$ may be about 220 g.

Figure 11:
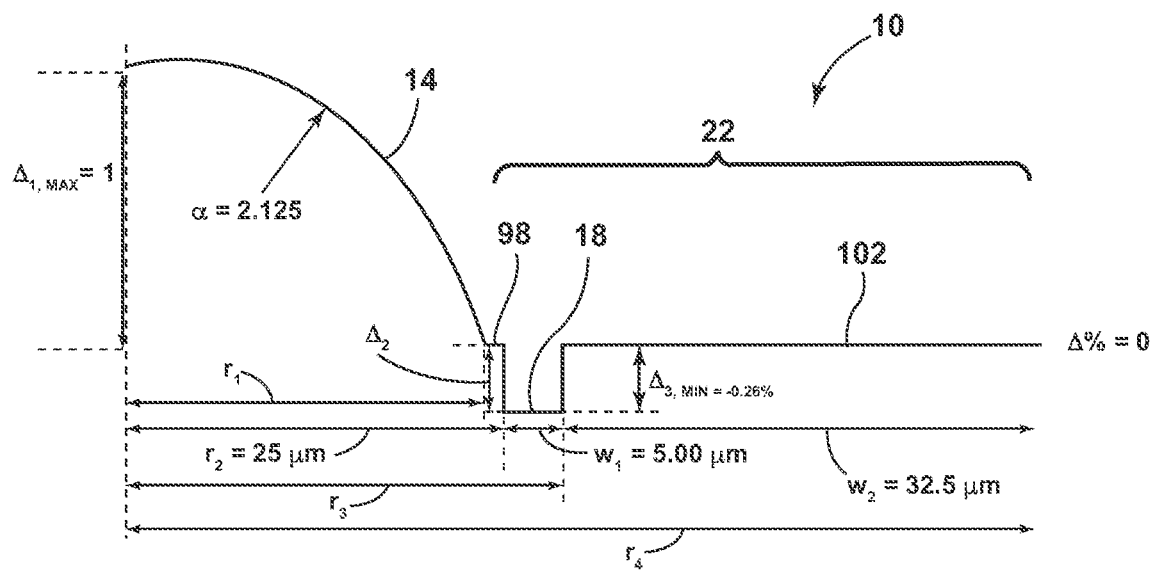
FIG. 11 is a refractive index profile for an optical fiber having example profile 1 of FIG. 9.

Referring to FIGS. 9 and 11, a refractive index profile curve for example profile 1 is illustrated. In various examples, the core 14 may have the core radius $r_1$ of about 25 µm and the depressed-index region 18 with the depressed-index region width $w_1$ of about 5 µm. The peak delta $\Delta_{1,MAX}$ may be about 1%. The draw tension range $\Delta$T for producing the example profile 1 optical fiber 10 may extend from $T_1$ and $T_2$. The difference between $T_1$ and $T_2$ may be about 175 g. For example, $T_1$ may be about 45 g and $T_2$ may be about 220 g.

It is contemplated that the different draw tensions T may be used to create different peak wavelengths $\lambda_P$ for the optical fiber 10. The draw tension T can be selected based on a correlation between the peak wavelength $\lambda_P$ and the draw tension T, where the correlation includes the correlation constant K. According to various aspects, the value of the correlation constant K for the optical fiber 10 having the example profile 1 may be about −1.93 nm/g. As previously explained, the correlation constant K is a function of the parameters of the optical fiber 10, including at least one of the core radius $r_1$, the volume v of the depressed-index region, the refractive index value $\Delta$ %, the peak wavelength $\lambda_P$, and the target peak wavelength $\lambda_{P,target}$. Each of the parameters affecting the correlation constant K, in combination with the change in draw tension $\Delta$T (e.g., the adjustment tension $\Delta$T), may define the peak wavelength $\lambda_P$, and the tuning range. The tuning range may extend between $\lambda_1$ and $\lambda_2$. In various examples, the difference between $\lambda_1$ and $\lambda_2$ may be about 340 nm. Additionally or alternatively, $\lambda_1$ may be about 680 nm and $\lambda_2$ may be about 1020 nm for a target peak wavelength $\lambda_{P,target}$ of about 850 nm. Accordingly, the different parameters of the optical fiber 10 having the example profile 1 may provide for an increased tuning range $\Delta_{LP}$ relative to the comparative exemplary profile.

Figure 12:
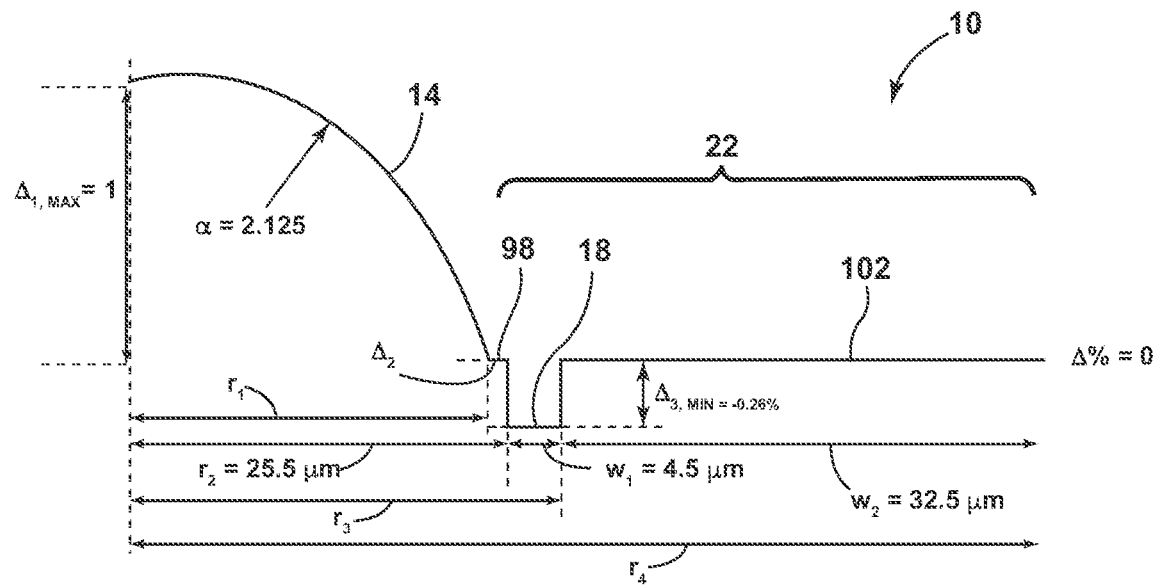
FIG. 12 is a refractive index profile for an optical fiber having example profile 2 of FIG. 9.

Referring to FIGS. 9 and 12, a refractive index profile curve for the optical fiber 10 having the example profile 2 is illustrated. According to various aspects, the optical fiber 10 may have the core radius $r_1$ of about 25.5 µm and a depressed-index region 18 having the depressed-index region width $w_1$ of about 4.5 µm. The peak delta $\Delta_{1,MAX}$ may be about 1%. The draw tension range $\Delta$T for producing optical fibers 10 having the example profile 2 may extend between $T_1$ and $T_2$. The difference between $T_1$ and $T_2$ may be about 175 g. For example, $T_1$ may be about 45 g and $T_2$ may be about 220 g. The correlation constant K value for the example profile 2 may be about −2.48 nm/g. Similarly to example profile 1, the correlation constant K value for example profile 2 may depend on the core radius $r_1$, the depressed-index region volume v the refractive index value $\Delta$ %, the peak wavelength $\lambda_P$, and the target peak wavelength $\lambda_{P,target}$. The correlation constant K may be multiplied by the draw tension T to define the peak wavelength $\lambda_P$ and the tuning range for the example profile 2. The tuning range may extend between $\lambda_1$ and $\lambda_2$. In various examples, the difference between $\lambda_1$ and $\lambda_2$ may be about 430 nm. In various examples, $\lambda_1$ may be about 635 nm and $\lambda_2$ may be about 1065 nm for the target peak wavelength $\lambda_{P,target}$ of about 850 nm. Accordingly, the different parameters of the optical fiber 10 having the example profile 2 may provide for an increased tuning range relative to the comparative exemplary profile and the example profile 1.

Figure 13:
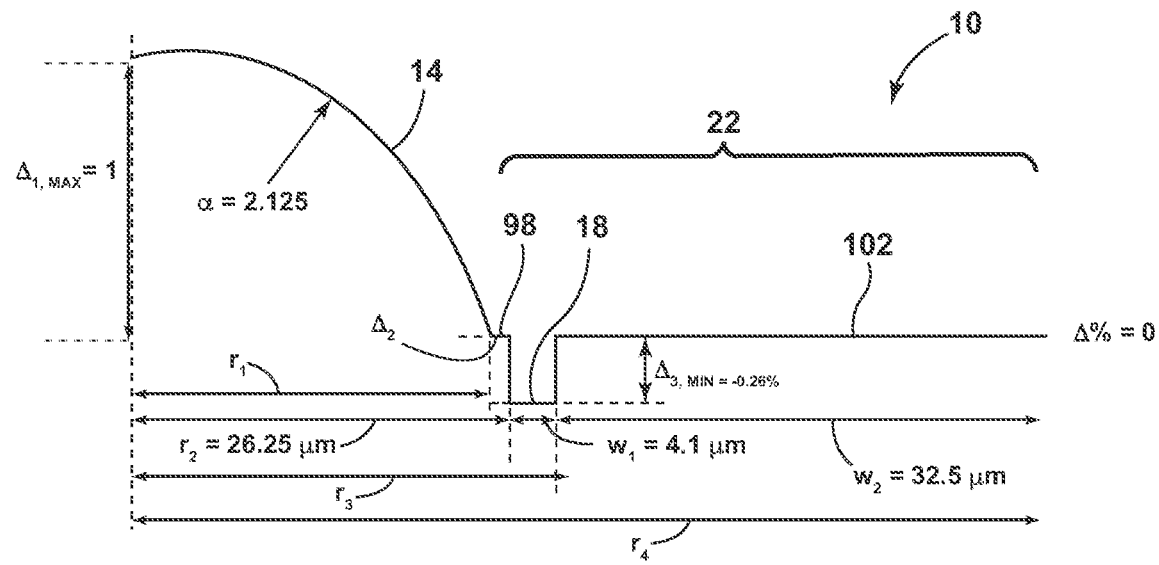
FIG. 13 is a refractive index profile for an optical fiber having example profile 3 of FIG. 9.

Referring to FIGS. 9 and 13, a refractive index profile curve for the optical fiber 10 having the example profile 3 is illustrated. In various examples, the optical fiber 10 having the example profile 3 may have the core radius $r_1$ of about 26.25 µm and the depressed-index region 18 having the depressed-index region width $w_1$ of about 4 µm. The peak delta $\Delta_{1,MAX}$ may be about 1.02%. The draw tension range $\Delta$T for producing optical fiber 10 having the example profile 3 may extend from $T_1$ and $T_2$. The difference between $T_1$ and $T_2$ may be about 175 g. For example, $T_1$ may be about 45 g and $T_2$ may be about 220 g. The correlation constant K value for example profile 3 may be about −2.48 nm/g. Similar to the example profiles 1 and 2, the correlation constant K value for the example profile 3 may depend on the core radius $r_1$, the depressed-index region volume v, the refractive index value $\Delta$ %, peak wavelength $\lambda_P$ and the target peak wavelength $\lambda_{P,target}$. Moreover, the peak wavelength $\lambda_P$ and the tuning range of the optical fiber 10 of the example profile 3 may be defined by the relationship between the correlation constant K value and the draw tension T. The tuning range may extend between $\lambda_1$ and $\lambda_2$. In various examples, the difference between $\lambda_1$ and $\lambda_2$ may be about 560 nm. In various examples, $\lambda_1$ may be about 570 nm and $\lambda_2$ may be about 1130 nm for the target peak wavelength $\lambda_{P,target}$ of about 850 nm. Accordingly, the different parameters of the optical fiber 10 having the example profile 3 may provide for an increased tuning range $\Delta_{LP}$ relative to the comparative exemplary profile and example profiles 1 and 2.

Figure 14:
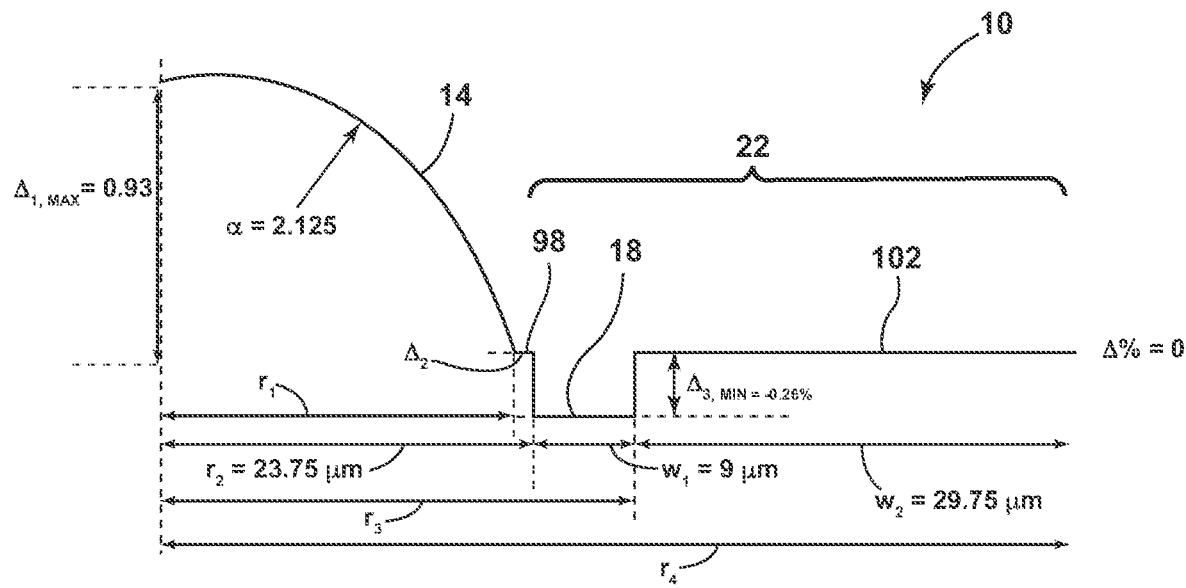
FIG. 14 is a refractive index profile for an optical fiber having example profile 4 of FIG. 9.

Referring to FIGS. 9 and 14, a refractive index profile curve for the optical fiber 10 having the example profile 4 is illustrated. In various examples, the optical fiber 10 having the example profile 4 may have the core radius $r_1$ of about 23.75 μm and the depressed-index region 18 having the depressed-index region width $w_1$ of about 9 μm. The peak delta $\Delta_{1,MAX}$ may be about 0.93%. The draw tension range $\Delta T$ for producing optical fiber 10 having the example profile 4 may extend from $T_1$ and $T_2$. The difference between $T_1$ and $T_2$ may be about 175 g. For example, $T_1$ may be about 45 g and $T_2$ may be about 220 g. The correlation constant K value for example profile 4 may be about −0.5 nm/g. Similar to the example profiles 1-3, the correlation constant K value for the example profile 4 may depend on the core radius $r_1$, the depressed-index region volume v, the refractive index value 4%, and the peak wavelength $\lambda_P$, the target peak wavelength $\lambda_{P,target}$. Moreover, the peak wavelength $\lambda_P$ and the tuning range of the optical fiber 10 of the example profile 4 may be defined by the relationship between the correlation constant K value and the draw tension T. The tuning range may extend between $\lambda_1$ and $\lambda_2$. In various examples, the difference between $\lambda_1$ and $\lambda_2$ may be about 90 nm. Accordingly, the different parameters of the optical fiber 10 having the example profile 4 may provide for decreased peak wavelength tuning range $\Delta_{LP}$ relative to the comparative exemplary profile and example profiles 1-3.

Figure 15:
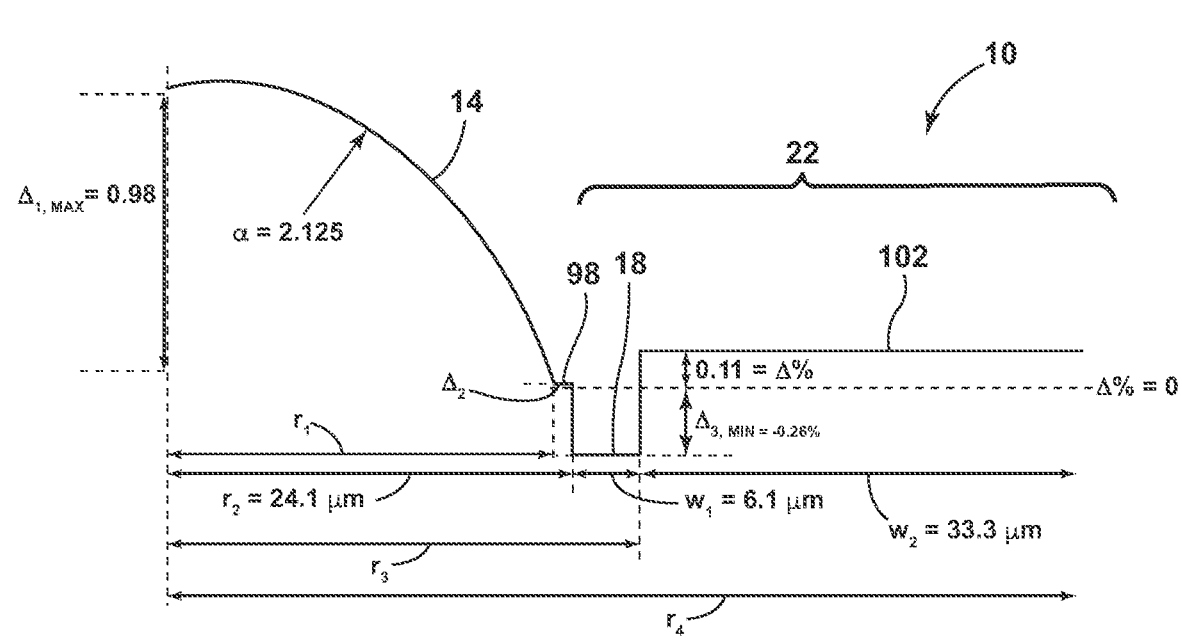
FIG. 15 is a refractive index profile for an optical fiber having example profile 5 of FIG. 9.

Referring to FIGS. 9 and 15, a refractive index profile curve for the optical fiber 10 having the example profile 5 is illustrated. In various examples, the optical fiber 10 having the example profile 5 may have the core radius $r_1$ of about 24.1 μm and the depressed-index region 18 having the depressed-index region width $w_1$ of about 6.1 μm. The peak delta $\Delta_{1,MAX}$ may be about 0.98%. Additionally, the outer cladding 102 may be up-doped to a delta of about 0.11%. The draw tension range $\Delta T$ for producing optical fiber 10 having the example profile 5 may extend from $T_1$ and $T_2$. The difference between $T_1$ and $T_2$ may be about 175 g. For example, $T_1$ may be about 45 g and $T_2$ may be about 220 g. The correlation constant K value for example profile 5 may be about −2.27 nm/g. Similar to the example profiles 1-4, the correlation constant K value for the example profile 5 may depend on the core radius $r_1$, the depressed-index region volume v, the refractive index value Δ %, the peak wavelength $\lambda_P$, and the target peak wavelength $\lambda_{P,target}$. Moreover, the peak wavelength $\lambda_P$ and the tuning range of the optical fiber 10 of the example profile 5 may be defined by the relationship between the correlation constant K value and the draw tension T. The tuning range may extend between $\lambda_1$ and $\lambda_2$. In various examples, the difference between $\lambda_1$ and $\lambda_2$ may be about 400 nm. Accordingly, the different parameters of the optical fiber 10 having the example profile 5 may provide for an increased tuning range relative to the comparative exemplary profile and example profiles 1 and 4 and a decreased tuning range relative to example profiles 2 and 3.

Referring to FIGS. 9-15, the modification in the core radius $r_1$, the depressed-index region volume v (e.g., width $w_1$ and depth d), and the relative refractive index Δ %, as well as the selection of the target peak wavelength $\lambda_{P,target}$ may adjust the correlation constant K of the optical fiber 10. Adjustments to the correlation constant K may correspond with adjusting the peak wavelength $\lambda_P$ and/or the tuning range. Moreover, each of the example profiles 1-5 and the comparative exemplary profile, illustrated herein, may include the same, or substantially similar, alpha-value for the refractive index profile, which may correspond with a same peak wavelength $\lambda_P$ (e.g., about 850 nm). With a same or substantially similar alpha profile and a same, the peak wavelength $\lambda_P$ and the tuning range $\Delta_{LP}$ of the optical fiber 10 may be adjusted using the method 150, disclosed herein, relative to the comparative exemplary profile not made according to the present method 150. This method 150 may be advantageous for generating a refractive index profile for the optical fiber 10 that provides for maximum adjustment of the tuning range for a selected draw tension T. As such, using the draw tension T in a range of from about 45 g to about 220 g and different parameters of the optical fiber 10, the peak wavelength $\lambda_P$ and the tuning range can be adjusted, as illustrated in FIGS. 9-15. Moreover, the tuning range can be adjusted to over twice the peak tuning range of the comparative exemplary profile illustrated in FIG. 10. As such, optical fibers 10 having different peak wavelengths $\lambda_P$, tuning ranges, and parameters may be manufactured using the method 150, disclosed herein, and/or a single production system 26.

Referring to FIGS. 9 and 11-15, the example refractive index profiles of example profiles 1-5, each manufactured according to the method 150 disclosed herein, are illustrated, respectively. For each of the optical fibers 10 having example profiles 1-5, the core 14 may be a parabolic doped core 14 producing the alpha profile. As illustrated, the alpha profile may be about 2.125. The cladding 22 of the optical fiber 10 may include the inner cladding 98 and the outer cladding 102, which are separated from one another by the depressed-index region 18. The core 14 may be up-doped to the peak delta $\Delta_{1,MAX}$ and then may be down-doped to where delta is about 0%. In examples having the inner cladding 98, the inner cladding 98 may each have a delta of about 0%. Additionally or alternatively, the optical fiber 10 may be down-doped to produce the depressed-index region 18 having a negative delta. In this way, the depressed-index region 18 may define the minimum delta $\Delta_{3,MIN}$ of the optical fiber 10. In various examples, the outer cladding 102 of the optical fiber 10 may be up-doped to return the delta to a value of in a range of from about 0% to about 0.15%.

Use of the presently disclosed device may provide for a variety of advantages. For example the optical fibers 10 having different peak wavelengths $\lambda_P$ may be manufactured within an increased tuning range using the method 150 disclosed herein. Additionally, the optical fiber 10 may have an increased tuning range relative to a comparative exemplary profile not manufactured with the present method 150. Further, the tuning range $\Delta_{LP}$ may be more than twice the peak wavelength tuning range $\Delta_{LP}$ of the comparative exemplary profile not manufactured according to the method 150 herein. Moreover, the method 150 may utilize a single production system 26 to produce optical fibers 10 having the different peak wavelengths $\lambda_P$ within the tuning range using the correlation between the peak wavelength $\lambda_P$ and the draw tension T. The correlation constant K is a function of at least one of the core radius $r_1$, the depressed-index region volume v, the relative refractive index 4%, the peak delta $\Delta_{1,MAX}$, the peak wavelength $\lambda_P$, and target peak wavelength $\lambda_{P,target}$. Also, in manufacturing the optical fiber 10, the peak wavelength $\lambda_P$ may be adjusted to optimize the optical fiber 10 at different wavelengths, which may be in a range of from about 850 nm to about 1060 nm. By selecting the optical fiber 10 parameters (e.g., to produce the correlation constant K value) and the draw tension T, the optical fiber 10 may have a larger or smaller tuning range compared to the comparative exemplary profile. In this way, the single production system 26 may manage multiple fiber processes to produce multiple different optical fibers 10. Further, a single preform 42 may produce optical fibers 10 that are optimized at different wavelengths. In this way, the optical fiber 10 may be optimized at about 850 nm, about 880 nm, 980 nm, and/or about 1060 nm.

The device disclosed herein is further summarized in the following paragraphs and is further characterized by combinations of any and all of the various aspects described herein. The following non-limiting aspects are encompassed by the present disclosure:

According to at least one example, a method of manufacturing a multimode optical fiber includes specifying a peak wavelength $\lambda_P$ for the multimode optical fiber. The peak wavelength $\lambda_P$ corresponds to a wavelength at which the multimode optical fiber has a maximum bandwidth. The multimode optical fiber comprises a core and a cladding surrounding and directly adjacent to the core. The core has a radius $r_1$ and a maximum relative refractive index $\Delta_{1,MAX} > 0$. The cladding comprises a depressed-index region having a minimum relative refractive index $\Delta_{3,MIN} < 0$ and a volume v. A draw tension T for the multimode optical fiber is selected based on a correlation relating peak wavelength $\lambda_P$ to draw tension T, the correlation comprising a correlation constant. The correlation constant K is a function of at least one of $\Delta_{1,MAX}$, $r_1$, v, $\Delta_{3,MIN}$, and $\lambda_P$. The multimode optical fiber is drawn from a preform at the draw tension T.

According to another aspect, the draw tension T is in a range of from about 45 g to about 220 g.

According to another aspect, a correlation constant K is in a range of from about −0.45 nm/g to about −3.25 nm/g.

According to another aspect, a core radius $r_1$ is about 25 μm. A width $w_1$ of the depressed-index region is about 4.5 μm.

According to another aspect, the peak wavelength $\lambda_P$ is in a range of from about 680 nm to about 1020 nm.

According to another aspect, the core radius $r_1$ is about 25.5 μm. A width $w_1$ of the depressed-index region is about 4.5 μm.

According to another aspect, the peak wavelength $\lambda_P$ is in a range of from about 635 nm to about 1065 nm.

According to another aspect of the present disclosure, a method of manufacturing a multimode optical fiber includes drawings the multimode optical fiber from a preform at a draw tension T. The multimode optical fiber comprises a core and a cladding surrounding and directly adjacent to the core. The core has a radius $r_1$ and a maximum relative refractive index $\Delta_{1,MAX} > 0$. The cladding is comprised of a depressed-index region having a maximum relative refractive index $\Delta_{3,MIN} < 0$ and a volume v. The multimode optical fiber has a peak wavelength $\lambda_P$ at which the multimode optical fiber has a maximum bandwidth. The peak wavelength $\lambda_P$ is compared to a selected target peak wavelength $\lambda_{P,target}$. The peak wavelength $\lambda_P$ differs from the selected target peak wavelength $\lambda_{P,target}$ by a difference magnitude $\Delta\lambda_P$ given by $\Delta\lambda_P = |\lambda_P - \lambda_{P,target}|$. The draw tension T is changed by an adjustment tension $\Delta T$. The adjustment tension $\Delta T$ is selected to vary the peak wavelength $\lambda_P$ to reduce the difference magnitude $\Delta\lambda_P$. The selection of the adjustment tension $\Delta T$ is based on a correlation relating the adjustment tension $\Delta T$ to the difference magnitude $\Delta\lambda_P$. The correlation comprises a correlation constant K. The correlation constant K is a function of at least one of $\Delta_{1,MAX}$, $r_1$, v, $\Delta_{3,MIN}$, and $\lambda_{P,target}$.

According to another aspect, a correlation relating the adjustment tension $\Delta T$ to the difference magnitude $\Delta\lambda_P$ is defined as $\Delta\lambda_P = K * \Delta T$.

According to another aspect, a selected target peak wavelength $\lambda_{P,target}$ is in a tuning range defined between $\lambda_1$ and $\lambda_2$. A difference between $\lambda_1$ and $\lambda_2$ is about 340 nm.

According to another aspect, a selected target peak wavelength $\lambda_{P,target}$ is defined between $\lambda_1$ and $\lambda_2$. A difference between $\lambda_1$ and $\lambda_2$ is about 430 nm.

According to another aspect, a selected target peak wavelength $\lambda_{P,target}$ is in a tuning range defined between $\lambda_1$ and $\lambda_2$. A difference between $\lambda_1$ and $\lambda_2$ is about 560 nm.

According to another aspect, $\lambda_1$ is about 570 nm and $\lambda_2$ is about 1130 nm.

According to another aspect, an adjustment tension $\Delta T$ is defined between $T_1$ and $T_2$. The difference between $T_1$ and $T_2$ is about 175 g.

According to another aspect, $T_1$ is about 45 g and $T_2$ is about 220 g.

According to another aspect of the present disclosure, a multimode optical fiber includes a core having a core radius $r_1$ in a range of from about 25 μm to about 27 μm. The core is doped to define a peak relative refractive index $\Delta_{1,MAX} > 0$. A cladding surrounds and is directly adjacent to the core, the cladding comprises a depressed-index region having a minimum relative refractive index $\Delta_{3,MIN} < 0$ and a width $w_1$. The width $w_1$ is in a range of from about 4 μm to about 5 μm. The multimode optical fiber has a peak wavelength $\lambda_P$ at which the multimode optical fiber has a maximum bandwidth. The peak wavelength $\lambda_P$ is a function of at least one of the peak relative refractive index $\Delta_{1,MAX}$, the core radius $r_1$, the width $w_1$ of the depressed-index region, and the minimum relative refractive index $\Delta_{3,MIN}$.

According to another aspect, a core radius $r_1$ is about 25 μm and the moat width $w_1$ is about 5 μm and a tuning range is defined between $\lambda_1$ and $\lambda_2$. A difference between $\lambda_1$ and $\lambda_2$ is about 340 nm.

According to another aspect, a core radius $r_1$ is about 24.1 μm and the moat width $w_1$ is about 9.1 μm and a tuning range is defined between $\lambda_1$ and $\lambda_2$. A difference between $\lambda_1$ and $\lambda_2$ is about 400 nm.

According to another aspect, a core radius $r_1$ is about 25.5 μm and the moat width $w_1$ is about 4.5 μm and a tuning range is defined between $\lambda_1$ and $\lambda_2$. A difference between $\lambda_1$ and $\lambda_2$ is about 430 nm.

According to another aspect, a peak wavelength $\lambda_P$ is within a tuning range of from about 570 nm to about 1130 nm. The tuning range is based on a correlation between draw tension T and at least one of $\Delta_{1,MAX}$, $r_1$, $w_1$, $\Delta_{3,MIN}$, and $\lambda_P$.

Aspect 1 of the description is:
A method of manufacturing a multimode optical fiber, comprising:
  specifying a peak wavelength $\lambda_P$ for the multimode optical fiber, the peak wavelength $\lambda_P$ corresponding to a wavelength at which the multimode optical fiber has a maximum bandwidth, the multimode optical fiber comprising a core and a cladding surrounding and directly adjacent to the core, the core having a radius $r_1$ and a maximum relative refractive index $\Delta_{1,MAX} > 0$, the cladding comprising a depressed-index region having a minimum relative refractive index $\Delta_{3,MIN} < 0$ and a volume v;
  selecting a draw tension T for the multimode optical fiber based on a correlation relating peak wavelength $\lambda_P$ to draw tension T, the correlation comprising a correlation constant, the correlation constant K being a function of at least one of $\Delta_{1,MAX}$, $r_1$, v, $\Delta_{3,MIN}$, and $\lambda_P$; and drawing the multimode optical fiber from a preform at the draw tension T.

Aspect 2 of the description is:
The method of Aspect 1, wherein the draw tension T is in a range of from about 45 g to about 220 g.

Aspect 3 of the description is:
The method of Aspect 1 or 2, the correlation constant K is in a range of from about −0.45 nm/g to about −3.25 nm/g.

Aspect 4 of the description is:
The method of any of Aspects 1-3, wherein the core radius $r_1$ is about 25 μm, and wherein a width $w_1$ of the depressed-index region is about 5 μm.

Aspect 5 of the description is:
The method of any of Aspects 1-3, wherein the core radius $r_1$ is about 25.5 μm, and wherein a width $w_1$ of the depressed-index region is about 4.5 μm.

Aspect 6 of the description is:
The method of any of Aspects 1-5, wherein the peak wavelength $\lambda_P$ is in a range of from about 635 nm to about 1065 nm.

Aspect 7 of the description is:
The method of any of Aspects 1-5, wherein the peak wavelength $\lambda_P$ is in a range of from about 680 nm to about 1020 nm.

Aspect 8 of the description is:
A method of manufacturing a multimode optical fiber, comprising:
drawing the multimode optical fiber from a preform at a draw tension T, the multimode optical fiber comprising a core and a cladding surrounding and directly adjacent to the core, the core having a radius $r_1$ and a maximum relative refractive index $\Delta_{1,MAX}>0$, the cladding comprising a depressed-index region having a minimum relative refractive index $\Delta_{3,MIN}<0$ and a volume v, the multimode optical fiber having a peak wavelength $\lambda_P$ at which the multimode optical fiber has a maximum bandwidth;
comparing the peak wavelength $\lambda_P$ to a selected target peak wavelength $\lambda_{P,target}$, the peak wavelength $\lambda_P$ differing from the selected target peak wavelength $\lambda_{P,target}$ by a difference magnitude $\Delta\lambda_P$ given by $\Delta\lambda_P=|\lambda_P-\lambda_{P,target}|$; and
changing the draw tension T by an adjustment tension $\Delta T$, the adjustment tension $\Delta T$ selected to vary the peak wavelength $\lambda_P$ to reduce the difference magnitude $\Delta\lambda_P$,
wherein the selection of the adjustment tension $\Delta T$ is based on a correlation relating the adjustment tension $\Delta T$ to the difference magnitude $\Delta\lambda_P$, the correlation comprising a correlation constant K, the correlation constant K being a function of at least one of $\Delta_{1,MAX}$, $r_1$, v, $\Delta_{3,MIN}$, and $\lambda_{P,target}$.

Aspect 9 of the description is:
The method of Aspect 8, wherein the correlation relating the adjustment tension $\Delta T$ to the difference magnitude $\Delta\lambda_P$ is defined as $\Delta\lambda_P=K*\Delta T$.

Aspect 10 of the description is:
The method of Aspect 8 or 9, wherein the selected target peak wavelength $\lambda_{P,target}$ is in a tuning range defined between $\lambda_1$ and $\lambda_2$, and wherein a difference between $\lambda_1$ and $\lambda_2$ is about 340 nm.

Aspect 11 of the description is:
The method of Aspect 8 or 9, wherein the selected target peak wavelength $\lambda_{P,target}$ is defined between $\lambda_1$ and $\lambda_2$, and wherein a difference between $\lambda_1$ and $\lambda_2$ is about 430 nm.

Aspect 12 of the description is:
The method of Aspect 8 or 9, wherein the selected target peak wavelength $\lambda_{P,target}$ is in a tuning range defined between $\lambda_1$ and $\lambda_2$, and wherein a difference between $\lambda_1$ and $\lambda_2$ is about 560 nm.

Aspect 13 of the description is:
The method of Aspect 12, wherein $\lambda_1$ is about 570 nm and $\lambda_2$ is about 1130 nm.

Aspect 14 of the description is:
The method of any of Aspects 8-13, wherein the adjustment tension $\Delta T$ is defined between $T_1$ and $T_2$, wherein the difference between $T_1$ and $T_2$ is about 175 g.

Aspect 15 of the description is:
The method of Aspect 14, wherein $T_1$ is about 45 g and $T_2$ is about 220 g.

Aspect 16 of the description is:
A multimode optical fiber, comprising:
a core having a core radius $r_1$ in a range of from about 25 μm to about 27 μm, wherein the core is doped to define a peak relative refractive index $\Delta_{1,MAX}>0$; and
a cladding surrounding and directly adjacent to the core, the cladding comprising a depressed-index region having a minimum relative refractive index $\Delta_{3,MIN}<0$ and a width w, the width $w_1$ being in a range of from about 4 μm to about 5 μm,
wherein the multimode optical fiber has a peak wavelength $\lambda_P$ at which the multimode optical fiber has a maximum bandwidth, the peak wavelength $\lambda_P$ being a function of at least one of the peak relative refractive index $\Delta_{1,MAX}$, the core radius $r_1$, the width $w_1$ of the depressed-index region, and the minimum relative refractive index $\Delta_{3,MIN}$.

Aspect 17 of the description is:
The multimode optical fiber of Aspect 16, wherein the core radius $r_1$ is about 25 μm and the moat width $w_1$ is about 5 μm and the tuning range is defined between $\lambda_1$ and $\lambda_2$, and wherein a difference between $\lambda_1$ and $\lambda_2$ is about 340 nm.

Aspect 18 of the description is:
The multimode optical fiber of Aspect 16, wherein the core radius $r_1$ is about 24.1 μm and the moat width $w_1$ is about 9.1 μm and the tuning range is defined between $\lambda_1$ and $\lambda_2$, and wherein a difference between $\lambda_1$ and $\lambda_2$ is about 400 nm.

Aspect 19 of the description is:
The multimode optical fiber of Aspect 16, wherein the core radius $r_1$ is about 25.5 μm and the moat width $w_1$ is about 4.5 μm and the tuning range is defined between $\lambda_1$ and $\lambda_2$, and wherein a difference between $\lambda_1$ and $\lambda_2$ is about 430 nm.

Aspect 20 of the description is:
The multimode optical fiber of any of Aspects 16-19, wherein the peak wavelength $\lambda_P$ is within a tuning range of from about 570 nm to about 1130 nm, and wherein the tuning range is based on a correlation between draw tension and at least one of $\Delta_{1,MAX}$, $r_1$, $w_1$, $\Delta_{3,MIN}$, and $\lambda_P$.

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

What is claimed is:
1. A method of manufacturing a multimode optical fiber, comprising:
providing a preform;
specifying a peak wavelength $\lambda_P$ for the multimode optical fiber, wherein the peak wavelength $\lambda_P$ is within a tuning range between $\lambda_1$ and $\lambda_2$, the peak wavelength $\lambda_P$ corresponding to a wavelength at which the multimode optical fiber has a maximum bandwidth, the multimode optical fiber comprising a core and a clad- ding surrounding and directly adjacent to the core, the core having a radius $r_1$ and a maximum relative refractive index $\Delta_{1,MAX} > 0$, the cladding comprising a depressed-index region having a minimum relative refractive index $\Delta_{3,MIN} < 0$ and a volume v;

selecting a draw tension T for the multimode optical fiber based on a correlation relating peak wavelength $\lambda_P$ to draw tension T, the correlation comprising a correlation constant K, the correlation constant K being a function of at least one of $\Delta_{1,MAX}$, $r_1$, v, $\Delta_{3,MIN}$, and $\lambda_P$;

adjusting a fiber parameter of the multimode optical fiber by adjusting a preform parameter and a draw process parameter to, consequently, adjust the tuning range and difference between $\lambda_1$ and $\lambda_2$; and drawing the multimode optical fiber from the preform at the draw tension T.

2. The method of claim 1, wherein the draw tension T is in a range of from about 45 g to about 220 g.

3. The method of claim 1, wherein the correlation constant K is in a range of from about −0.45 nm/g to about −3.25 nm/g.

4. The method of claim 1, wherein the core radius $r_1$ is about 25 μm, and wherein a width $w_1$ of the depressed-index region is about 5 μm.

5. The method of claim 4, wherein the peak wavelength $\lambda_P$ is in a range of from about 680 nm to about 1020 nm.

6. The method of claim 1, wherein the core radius $r_1$ is about 25.5 μm, and wherein a width $w_1$ of the depressed-index region is about 4.5 μm.

7. The method of claim 6, wherein the peak wavelength $\lambda_P$ is in a range of from about 635 nm to about 1065 nm.

8. A method of manufacturing a multimode optical fiber, comprising:

drawing the multimode optical fiber from a preform at a draw tension T, the multimode optical fiber comprising a core and a cladding surrounding and directly adjacent to the core, the core having a radius $r_1$ and a maximum relative refractive index $\Delta_{1,MAX} > 0$, the cladding comprising a depressed-index region having a minimum relative refractive index $\Delta_{3,MIN} < 0$ and a volume v, the multimode optical fiber having a peak wavelength $\lambda_P$ at which the multimode optical fiber has a maximum bandwidth;

comparing the peak wavelength $\lambda_P$ to a selected target peak wavelength $\lambda_{P,target}$, wherein the selected target peak wavelength $\lambda_{P,target}$ is within a tuning range between $\lambda_1$ and $\lambda_2$, the peak wavelength $\lambda_P$ differing from the selected target peak wavelength $\lambda_{P,target}$ by a difference magnitude $\Delta\lambda_P$ given by $\Delta\lambda_P = |\lambda_P - \lambda_{P,target}|$;

changing the draw tension T by an adjustment tension $\Delta T$, the adjustment tension $\Delta T$ selected to vary the peak wavelength $\lambda_P$ to reduce the difference magnitude $\Delta\lambda_P$, wherein the selection of the adjustment tension $\Delta T$ is based on a correlation relating the adjustment tension $\Delta T$ to the difference magnitude $\Delta\lambda_P$, the correlation comprising a correlation constant K, the correlation constant K being a function of at least one of $\Delta_{1,max}$, $r_1$, v, $\Delta_{3,min}$, and $\lambda_{P,target}$; and adjusting the tuning range to adjust a difference between $\lambda_1$ and $\lambda_2$ by adjusting the correlation constant K through adjustments of a preform parameter and a draw process parameter; and drawing a subsequent multimode optical fiber from the preform at a second draw tension T, the second draw tension T being different than the draw tension T by the adjustment tension $\Delta T$.

9. The method of claim 8, wherein the correlation relating the adjustment tension $\Delta T$ to the difference magnitude $\Delta\lambda_P$ is defined as $\Delta\lambda_P = K*\Delta T$.

10. The method of claim 8, wherein a difference between $\lambda_1$ and $\lambda_2$ is about 340 nm.

11. The method of claim 8, wherein a difference between $\lambda_1$ and $\lambda_2$ is about 430 nm.

12. The method of claim 8, wherein a difference between $\lambda_1$ and $\lambda_2$ is about 560 nm.

13. The method of claim 12, wherein $\lambda_1$ is about 570 nm and $\lambda_2$ is about 1130 nm.

14. The method of claim 8, wherein the adjustment tension $\Delta T$ is defined between $T_1$ and $T_2$, wherein the difference between $T_1$ and $T_2$ is about 175 g.

15. The method of claim 14, wherein $T_1$ is about 45 g and $T_2$ is about 220 g.

16. A method of manufacturing a multimode optical fiber, comprising:

providing a preform; and drawing the multimode optical fiber from the preform, the multimode optical fiber including:

a core having a core radius $r_1$ in a range of from about 25 μm to about 27 μm, wherein the core is doped to define a peak relative refractive index $\Delta_{1,MAX} > 0$; and a cladding surrounding and directly adjacent to the core, the cladding comprising a depressed-index region having a minimum relative refractive index $\Delta_{3,MIN} < 0$ and a width $w_1$, the width $w_1$ being in a range of from about 4 μm to about 5 μm, wherein the peak wavelength $\lambda_P$ is within a tuning range defined between $\lambda_1$ and $\lambda_2$, the tuning range and a difference between $\lambda_1$ and $\lambda_2$ being adjustable based on an adjustment of a fiber parameter including at least one of the peak relative refractive index $\Delta_{1,MAX}$, the core radius $r_1$, the width $w_1$ of the depressed-index region, and the minimum relative refractive index $\Delta_{3,MIN}$, the fiber parameter being adjustable based on an adjustment to a preform parameter and an adjustment to a draw process parameter.

17. The method of claim 16, wherein the core radius $r_1$ is about 25 μm and the width $w_1$ is about 5 μm and the tuning range is defined between $\lambda_1$ and $\lambda_2$, and wherein a difference between $\lambda_1$ and $\lambda_2$ is about 340 nm.

18. The method of claim 16, wherein the core radius $r_1$ is about 26.25 μm and the width $w_1$ is about 4.1 μm and the tuning range is defined between $\lambda_1$ and $\lambda_2$, and wherein a difference between $\lambda_1$ and $\lambda_2$ is about 560 nm.

19. The method of claim 16, wherein the core radius $r_1$ is about 25.5 μm and the width $w_1$ is about 4.5 μm and the tuning range is defined between $\lambda_1$ and $\lambda_2$, and wherein a difference between $\lambda_1$ and $\lambda_2$ is about 430 nm.

20. The method of claim 16, wherein the peak wavelength $\lambda_P$ is within the tuning range where $\lambda_1$ is about 570 nm and where $\lambda_2$ is about 1130 nm, and wherein the tuning range is based on a correlation between draw tension and at least one of $\Delta_{1,MAX}$, $r_1$, $w_1$, $\Delta_{3,MIN}$, and $\lambda_P$.

* * * * *

UNITED STATES PATENT AND TRADEMARK OFFICE
CERTIFICATE OF CORRECTION

PATENT NO. : 11,698,485 B2
APPLICATION NO. : 17/120909
DATED : July 11, 2023
INVENTOR(S) : Xin Chen et al.

It is certified that error appears in the above-identified patent and that said Letters Patent is hereby corrected as shown below:

In the Claims

In Column 21, Line 13, in Claim 1, after "and" insert -- a --.

Signed and Sealed this
Thirtieth Day of January, 2024

Katherine Kelly Vidal
*Director of the United States Patent and Trademark Office*